US011711670B2

(12) United States Patent
Ding et al.

(10) Patent No.: US 11,711,670 B2
(45) Date of Patent: *Jul. 25, 2023

(54) METHOD FOR ACTIVATING SERVICE BASED ON USER SCENARIO PERCEPTION, TERMINAL DEVICE, AND SYSTEM

(71) Applicant: Huawei Technologies Co., Ltd., Shenzhen (CN)

(72) Inventors: Yuan Ding, Shenzhen (CN); Zhenyu Liu, Shenzhen (CN); Donghao Zhang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/535,394

(22) Filed: Nov. 24, 2021

(65) Prior Publication Data

US 2022/0086600 A1 Mar. 17, 2022

Related U.S. Application Data

(63) Continuation of application No. 17/011,784, filed on Sep. 3, 2020, now Pat. No. 11,218,842, which is a (Continued)

(30) Foreign Application Priority Data

Mar. 26, 2018 (CN) .......................... 201810253737.2

(51) Int. Cl.
*H04W 4/029* (2018.01)
*H04W 4/024* (2018.01)
*H04W 88/08* (2009.01)

(52) U.S. Cl.
CPC .......... *H04W 4/029* (2018.02); *H04W 4/024* (2018.02); *H04W 88/08* (2013.01)

(58) Field of Classification Search
CPC ..... H04W 4/029; H04W 4/024; H04W 88/08; H04W 8/245; H04W 4/80; H04L 65/40;
(Continued)

(56) References Cited

U.S. PATENT DOCUMENTS

| 11,039,020 B2 | 6/2021 | Raleigh et al. |
| 2015/0271630 A1 | 9/2015 | Ferrara et al. |

(Continued)

FOREIGN PATENT DOCUMENTS

| CN | 101739456 A | 6/2010 |
| CN | 102192738 A | 9/2011 |

(Continued)

*Primary Examiner* — Hirdepal Singh
(74) *Attorney, Agent, or Firm* — Leydig, Voit & Mayer, Ltd.

(57) ABSTRACT

A method for providing a service based on a user scenario, a terminal device, and a system. The terminal device perceives the user scenario with low power consumption, and a cloud-side service open platform determines a corresponding scenario package based on the user scenario, where the scenario package includes a plurality of pre-orchestrated services for the user scenario. The service open platform pushes data related to the determined scenario package to the terminal device, and the terminal device displays entry interfaces of the plurality of services, and provides a corresponding service based on an operation performed by a user on the entry interface.

24 Claims, 23 Drawing Sheets

Related U.S. Application Data continuation of application No. PCT/CN2019/074370, filed on Feb. 1, 2019.

(58) Field of Classification Search
CPC ....... H04L 67/146; H04L 67/51; H04L 67/52; H04L 67/75; Y02D 30/70
USPC ...................................................... 455/456.3
See application file for complete search history.

(56) References Cited

U.S. PATENT DOCUMENTS

| | | | |
|---|---|---|---|
| 2018/0041489 A1* | 2/2018 | Narayanan | H04W 4/80 |
| 2018/0173856 A1* | 6/2018 | Ahmed | H04L 63/0815 |
| 2018/0254959 A1 | 9/2018 | Mantyjarvi et al. | |
| 2018/0279095 A1 | 9/2018 | Xu et al. | |
| 2019/0034236 A1* | 1/2019 | Cheng | G06F 9/5027 |
| 2019/0273788 A1* | 9/2019 | Zhang | G06F 9/454 |

FOREIGN PATENT DOCUMENTS

| | | | |
|---|---|---|---|
| CN | 103199898 A | | 7/2013 |
| CN | 103456301 A | | 12/2013 |
| CN | 104504623 A | | 4/2015 |
| CN | 105424029 A | | 3/2016 |
| CN | 107040648 A | | 8/2017 |
| CN | 107590245 A | | 1/2018 |
| CN | 107786732 | * | 3/2018 |
| CN | 107786732 A | | 3/2018 |
| KR | 20170138261 A | | 12/2017 |
| WO | 2017026112 A1 | | 2/2017 |

* cited by examiner

METHOD FOR ACTIVATING SERVICE BASED ON USER SCENARIO PERCEPTION, TERMINAL DEVICE, AND SYSTEM

CROSS-REFERENCE TO RELATED APPLICATIONS

This application is a continuation of U.S. patent application Ser. No. 17/011,784, filed on Sep. 3, 2020, which is a continuation of International Application No. PCT/CN2019/074370, filed on Feb. 1, 2019. The International Application claims priority to Chinese Patent Application No. 201810253737.2, filed on Mar. 26, 2018. All of the aforementioned patent applications are hereby incorporated by reference in their entireties.

TECHNICAL FIELD

Aspects of this application relate to the terminal field, and more specifically, to a method for providing a service based on a user scenario, a terminal device, and a system.

BACKGROUND

With rapid development of the mobile internet, smart terminal devices represented by smartphones provide diversified services for users with various types of installed application programs (briefly referred to as "applications"), and increasingly become indispensable and important tools in daily lives of people.

In the prior art, a single application such as a social application, a shopping application, a map application, or a music application has a relatively simple function. These applications with single functions need to be developed by professional developers by using professional programming software and released to an application market or a website. Therefore, to meet requirements on applications in different scenarios, a user usually needs to search for and download various types of applications, install the applications on a terminal device of the user, and then obtain a required service by starting an installed application. To be specific, generally, a prerequisite for obtaining a service by the user by using the terminal device is that the user downloads, installs, and starts an application that provides the service. However, for most common users, they have no computer background, and are not very good at using a search engine or an application market to obtain and install applications. Consequently, it is difficult for them to obtain required services by using terminal devices. Although some individual comprehensive applications can provide a plurality of types of services simultaneously, flexibility is poor, and it is still difficult to meet differentiated requirements of a user in different scenarios. Therefore, how the terminal device simply, efficiently, and smartly provides a required service for a user to lower a technical requirement for obtaining the service and improve user experience of the terminal device becomes a technical problem that urgently needs to be resolved today.

SUMMARY

Aspects of this application provides a method for providing a service based on a user scenario, a terminal device, and a system. The user scenario is actively perceived, and a service required in the scenario is provided for a user based on the perceived scenario, so that a terminal device quickly and flexibly provides a service without installing an application, to improve smart experience of the terminal device.

According to a first aspect, an embodiment of this application provides a method for providing a service on a terminal device, including: identifying a user scenario of the terminal device, where the user scenario is related to a location of the terminal device or an area in which the terminal device is located; when determining, according to a preset scenario package activation policy, that the user scenario meets an activation condition of a first scenario package, sending a scenario package request message to a service open platform, where the scenario package request message includes an ID of the first scenario package, and the first scenario package includes at least one service related to the user scenario; receiving, by the terminal device, data of the first scenario package sent by the service open platform, and generating a service card based on the data and displaying the service card, where the service card includes a user interface of the at least one service; and providing, in response to an operation performed by a user on the user interface in the service card, a service corresponding to the user interface on which the user performs the operation. In this solution, the terminal device actively perceives the user scenario, and activates a corresponding scenario package based on the user scenario, to provide the user with a service that better matches the user scenario. In this way, convenience of obtaining a service by the user is improved, and a smart experience of the terminal device is improved.

In a possible implementation, the terminal device stores correspondence data that includes a correspondence between an identifier of a first area and an identifier of a wireless access point that covers the first area, and the identifying a user scenario of the terminal device includes: determining the user scenario of the terminal device based on an identifier of a wireless access point connected to the terminal device and the correspondence data. In this solution, the location of the terminal device is determined based on the pre-stored correspondence data, without relying on a positioning module of the terminal device. In this way, power consumption overheads are reduced while a service requirement is met.

In a possible implementation, the wireless access point includes a base station, the identifier of the wireless access point is a cell ID of the base station, and the determining the user scenario of the terminal device based on an identifier of a wireless access point connected to the terminal device and the correspondence data includes: periodically obtaining, by a modem of the terminal device, a cell ID of a base station connected to the terminal device, and periodically transmitting the obtained cell ID to a built-in microcontroller unit (MCU) of the terminal device, where the MCU continuously works when an application processor (AP) of the terminal device is in a sleep mode; receiving, by the MCU, the cell ID sent by the modem, and when determining, based on the correspondence data, that the received cell ID matches a cell ID of a base station that covers the first area, enabling the positioning module to determine a current location of the terminal device; and determining the user scenario of the terminal device based on the current location of the terminal device. In this solution, the location of the terminal device is determined through secondary positioning. The first positioning is coarse-grained positioning, and is used to determine whether the terminal device enters a geo-fence. The second positioning is fine-grained positioning, and is used to determine whether the terminal device enters a smaller area in the geo-fence. The first coarse-grained positioning is implemented by the MCU by matching the cell ID, and the positioning module is enabled only for the second fine-grained positioning. The MCU can run with relatively low power consumption when the application processor is in a sleep mode. Therefore, this positioning manner in which the coarse-grained positioning and the fine-grained positioning are combined greatly reduces a time for enabling the positioning module, and can locate the location of the terminal device with relatively low power consumption. In this way, a scenario package is further activated based on the location of the terminal device.

In a possible implementation, the wireless access point includes a base station, the identifier of the wireless access point is a cell ID of the base station, and the determining the user scenario of the terminal device based on an identifier of a wireless access point connected to the terminal device and the correspondence data includes: periodically obtaining, by a modem of the terminal device, a cell ID of a base station connected to the terminal device, and periodically reporting the obtained cell ID to a built-in microcontroller unit (MCU) of the terminal device, where the MCU continuously works when an application processor (AP) of the terminal device is in a sleep mode; and receiving, by the MCU, the cell ID sent by the modem, and when determining, based on the correspondence data, that the received cell ID matches a cell ID of a base station that covers the first area, determining the user scenario of the terminal device, where the user scenario represents that the terminal device enters the first area. In this solution, the MCU combines with the modem to position the terminal device, with no need to enable the positioning module with relatively high power consumption, and the area in which the terminal device is located can be determined with relatively low overheads, to meet a positioning requirement of a service that has a low requirement for location precision.

In a possible implementation, the wireless access point includes a base station and a Wi-Fi access point, the identifier of the wireless access point is a cell ID of the base station and a device identifier of the Wi-Fi access point, the correspondence data includes a correspondence between the identifier of the first area and the cell ID of the base station that covers the first area, and a correspondence between an identifier of a second area within the first area and a device identifier of a Wi-Fi access point that covers the second area, and the determining the user scenario of the terminal device based on an identifier of a wireless access point connected to the terminal device and the correspondence data includes: periodically obtaining, by a modem of the terminal device, a cell ID of a base station connected to the terminal device, and periodically transmitting the obtained cell ID to a built-in microcontroller unit (MCU) of the terminal device, where the MCU continuously works when an application processor (AP) of the terminal device is in a sleep mode; receiving, by the MCU, the cell ID sent by the modem, and when determining, based on the correspondence data, that the received cell ID matches a cell ID of a base station that covers the first area, enabling a Wi-Fi module; determining, by the Wi-Fi module based on a received Wi-Fi signal, a device identifier of a Wi-Fi access point that sends the Wi-Fi signal, and transmitting the obtained device identifier to the MCU; and receiving, by the MCU, the device identifier sent by the Wi-Fi module, and when determining, based on the correspondence data, that the received device identifier matches the device identifier of the Wi-Fi access point that covers the second area, determining the user scenario of the terminal device, where the user scenario represents that the terminal device enters the second area. Similar to the foregoing implementation, in this solution, the MCU combines with the Wi-Fi module to position the terminal device, with no need to enable the positioning module with relatively high power consumption, and the area in which the terminal device is located can be determined with relatively low overheads.

With reference to any one of the foregoing possible implementations, in another possible implementation, a period of reporting the cell ID by the modem is longer than a period of obtaining the cell ID. In this way, a frequency at which the MCU performs a cell ID matching operation can be reduced, and power consumption overheads caused by positioning of the terminal device can be further reduced.

In another possible implementation, the wireless access point is a Bluetooth device, the identifier of the wireless access point is an identifier of the Bluetooth device, and the determining the user scenario of the terminal device based on an identifier of a wireless access point connected to the terminal device and the correspondence data includes: determining, by a Bluetooth module of the terminal device based on a received Bluetooth signal, an identifier of a Bluetooth device that sends the Bluetooth signal, and transmitting the obtained identifier of the Bluetooth device to a built-in microcontroller unit (MCU) of the terminal device, where the MCU continuously works when an application processor (AP) of the terminal device is in a sleep mode; receiving, by the MCU, the identifier that is of the Bluetooth device and that is sent by the Bluetooth module, and when determining, based on the correspondence data, that the received identifier of the Bluetooth device matches the identifier of the Bluetooth device that covers the first area, determining the user scenario of the terminal device, where the user scenario represents that the terminal device approaches or enters the first area.

With reference to any one of the first aspect or the possible implementations of the first aspect, in another possible implementation, the method further comprises: downloading, by the terminal device from the service open platform that maintains geographical location information of the wireless access point, data of a correspondence between a geographical location of the first area and the identifier of the wireless access point that covers the first area, where the geographical location information of the wireless access point includes geographical location information of a plurality of areas and an identifier of at least one wireless access point that covers each area.

According to a second aspect, an embodiment of this application provides a method for providing a service on a terminal device, including: displaying first prompt information when the terminal device enters a first area; generating and displaying a first service card in response to an operation performed by a user on the first prompt information, where the first service card includes a user interface of a first scenario package, and the first scenario package includes a plurality of services related to the first area; displaying second prompt information when the terminal device enters a second area; and generating and displaying a second service card in response to an operation performed by the user on the second prompt information, where the second service card includes a user interface of a second scenario package, the second scenario package includes a plurality of services related to the second area, and the first scenario package is different from the second scenario package. In this solution, when the terminal device is located in different areas, differentiated services are provided for the user, to meet service requirements of the user in different scenarios, and improve smart experience of the terminal device.

In a possible implementation of the second aspect, the first prompt information and the second prompt information are notification bar messages or notifications displayed on a lock screen of the terminal device.

In another possible implementation of the second aspect, the first prompt information and the second prompt information are icons or controls on a home screen.

In another possible implementation of the second aspect, the first prompt information and the second prompt information are prompt messages in a HiBoard interface.

With reference to any one of the second aspect or the possible implementations of the second aspect, in another possible implementation, the plurality of services included in the first scenario package are services related to the first area, and the plurality of services included in the second scenario package are services related to the second area.

With reference to any one of the second aspect or the possible implementations of the second aspect, in another possible implementation, the first service card includes user interfaces of the plurality of services related to the first area, and the second service card includes user interfaces of the plurality of services related to the second area.

The user interface includes at least one of an icon, a shortcut, and a user guide text.

With reference to any one of the second aspect or the possible implementations of the second aspect, in another possible implementation, the second area is a subarea of the first area.

With reference to any one of the second aspect or the possible implementations of the second aspect, in another possible implementation, the second area and the first area are two different areas and are independent of each other.

With reference to any one of the second aspect or the possible implementations of the second aspect, in another possible implementation, after the user enters the second area, the terminal device exits the first scenario package, that is, stops a service included in the first scenario package. In this case, the user cannot access a service related to the first area in the second area, so that service permission control based on a user scenario (a location of the terminal device or an area in which the terminal device is located) can be implemented.

According to a third aspect, an embodiment of this application provides a method for providing a service for a terminal device, including: receiving, by a service open platform, a scenario package ID sent by the terminal device, where the scenario package ID corresponds to a scenario package that matches a user scenario of the terminal device, and the user scenario is related to a location of the terminal device or an area in which the terminal device is located; querying a preconfigured scenario package database based on the scenario package ID, to determine the scenario package corresponding to the scenario package ID, where the scenario package includes at least one service related to the user scenario; and sending data of the scenario package to the terminal device, where the data is used by the terminal device to generate a service card, and the service card includes a user interface of the at least one service.

In a possible implementation of the third aspect, the method further includes: receiving, by the service open platform, a scenario package submitted by a third-party service provider through an open interface, and after the scenario package is approved, storing the scenario package in the scenario package database.

In another possible implementation of the third aspect, the service open platform sends a scenario package activation policy to the terminal device, where the activation policy includes an activation condition of at least one scenario package.

According to a fourth aspect, an embodiment of this application provides a terminal device, including a processing circuit, a storage medium, and a computer program that is stored in the storage medium and that can be executed by the processing circuit. The steps of the method described in any one of the first aspect or the possible implementations of the first aspect are implemented when the processing circuit executes the program.

In a possible implementation of the fourth aspect, the processing circuit is an application processor or a microcontroller unit (MCU).

According to a fifth aspect, an embodiment of this application provides a terminal device, including a processing circuit, a storage medium, and a computer program that is stored in the storage medium and that can be executed by the processing circuit. The steps of the method described in any one of the second aspect or the possible implementations of the second aspect are implemented when the processing circuit executes the program.

According to a sixth aspect, an embodiment of this application provides a terminal device, including one or more functional units configured to perform the method according to any one of the first aspect or the possible implementations of the first aspect. These functional units may be implemented by software, may be implemented by hardware such as a processor, or may be implemented by combining software and necessary hardware.

According to a seventh aspect, an embodiment of this application provides a server, including a processor and a memory. The memory stores a computer program, and the steps of the method described in any one of the second aspect or the possible implementations of the second aspect are implemented when the processor executes the program.

According to an eighth aspect, an embodiment of this application provides a method for providing a service on a terminal device, and the terminal device stores data of a correspondence between an identifier of a first device and an ID of a first scenario package. The method includes: identifying an identifier of a device connected to the terminal device; when the identifier of the device is the same as the identifier of the first device, sending a scenario package request message to a service open platform, where the scenario package request message includes the ID of the first scenario package, and the first scenario package includes at least one service related to a user scenario; receiving, by the terminal device, data of the first scenario package sent by the service open platform, and generating a service card based on the data and displaying the service card, where the service card includes a user interface of the at least one service; and providing, in response to an operation performed by a user on the user interface in the service card, a service corresponding to the user interface on which the user performs the operation. In this solution, a corresponding scenario package is dynamically activated based on information about the device connected to the terminal device, to be specific, a scenario package is flexibly pushed based on device interconnection. In this way, user experience of the terminal device is improved.

In a possible implementation, the plurality of services include a service related to the first device.

According to a ninth aspect, an embodiment of this application provides a computer-readable storage medium. The computer-readable storage medium stores a computer program (instructions), and when the program (instructions)

is executed by a processor, the steps of the method according to any one of the first aspect or the possible implementations of the first aspect are implemented.

According to a tenth aspect, an embodiment of this application provides a computer-readable storage medium. The computer-readable storage medium stores a computer program (instructions), and when the program (instructions) is executed by a processor, the steps of the method according to any one of the second aspect or the possible implementations of the second aspect are implemented.

BRIEF DESCRIPTION OF DRAWINGS

To describe the technical solutions in the embodiments of this application more clearly, the following briefly describes the accompanying drawings required in the embodiments in this application.

DESCRIPTION OF EMBODIMENTS

Figure 1:
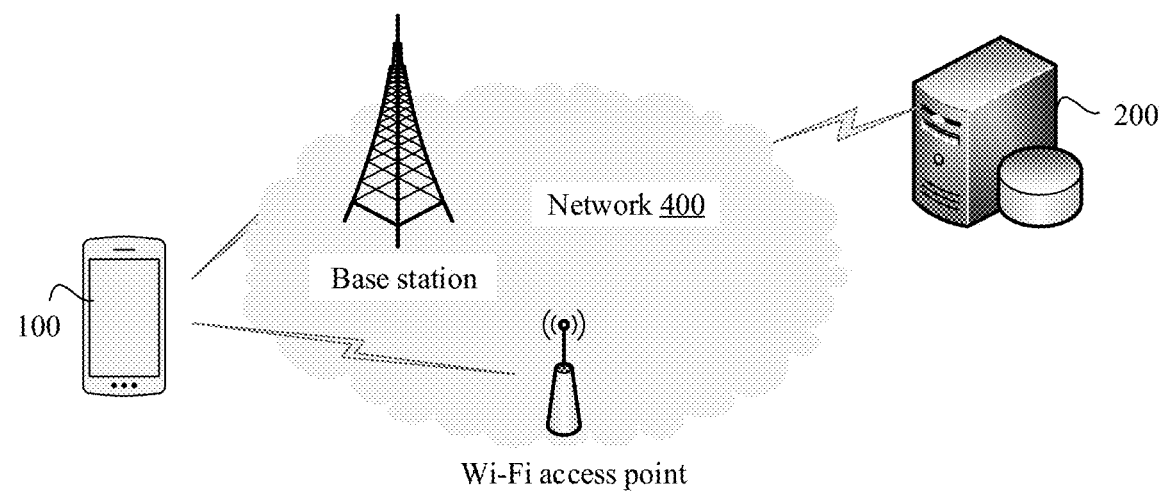
FIG. 1 is a schematic architectural diagram of a device-cloud synergy system according to an embodiment of this application.

The following specifically describes the technical solutions in the embodiments of this application with reference to the accompanying drawings in the embodiments of this application. Apparently, the described embodiments are merely some rather than all of the embodiments of this application.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise stated, "a plurality of" means two or more than two.

Before starting to describe specific embodiments of this application, the following first describes terms and meanings of the terms that may be mentioned in the following embodiments of this application. It may be understood that, unless otherwise specified, these terms and the meanings of the terms in the embodiments of this application may be the same.

In the following embodiments of this application, a service is an executable program that implements a specific function or provides specific content. For example, the service may be a web page that is developed by using a programming language such as a hypertext markup language (HTML), cascading style sheets (CSS), or JavaScript (JS) and that can be accessed by using a web browser, or may be an applet, a web application, or another type of application program that is developed by using JavaScript and can be used without installation. A function or content provided by a service is related to a type of the service. The service in the embodiments of this application includes but is not limited to a public information guidance service or another third-party service. The public information guidance service may include scenario guidance, a scenario map, and the like.

A user scenario (also briefly referred to as "scenario" in the following embodiments of this application) of a terminal device indicates a scenario in which a user using the terminal device is located. Typically, the user scenario is related to a geographical location (which is usually a location of the user using the terminal device) of the terminal device. For example, the user is in a library, a scenic spot, or an airport. In this case, the user scenario is an abstract representation of the location of the user or an area in which the user is located, and may be represented by an identifier of the location or the area, for example, an area name, location coordinates, or a keyword. The corresponding user scenario may be determined by perceiving the location of the user or the area in which the user is located. In addition to the location of the user, in some cases, the user scenario may be related to an interconnection status between terminal devices, for example, related to a device currently connected to the terminal device. In this case, the user scenario may be represented by an identifier of the connected device, for example, a device name or a device type. In some other cases, the user scenario may alternatively be related to time and/or a motion status of the user. For example, the user scenario may be that: the user is in school at night, or the user takes exercises in a gym.

The embodiments of this application provide a service providing method. A device-cloud synergy system perceives a user scenario with extremely low power consumption, and adaptively pushes, to a user, a service or a service combination required in the scenario, to improve user experience.

FIG. 1 is a schematic architectural diagram of a device-cloud synergy system according to an embodiment of this application. As shown in FIG. 1, the system may include at least one terminal device 100 and a service open platform 200. The terminal device 100 may access a network 400 by using a wireless access point such as a base station or a Wi-Fi access point, and communicate with the service open platform 200 by using the network 400, to obtain a corresponding policy and a service.

The terminal device 100 may be a portable electronic device such as a mobile phone, a tablet computer, a notebook computer, or a wearable device (for example, a smartwatch) having a wireless communication function. An example embodiment of the portable electronic device includes but is not limited to a portable electronic device using iOS®, Android®, Microsoft®, or another operating system. Alternatively, the terminal device 100 may be a mobile device such as a vehicle-mounted device, an augmented reality (AR) device, or a virtual reality (VR) device. Certainly, a specific form of the terminal device is not limited in the following embodiments.

Figure 2:
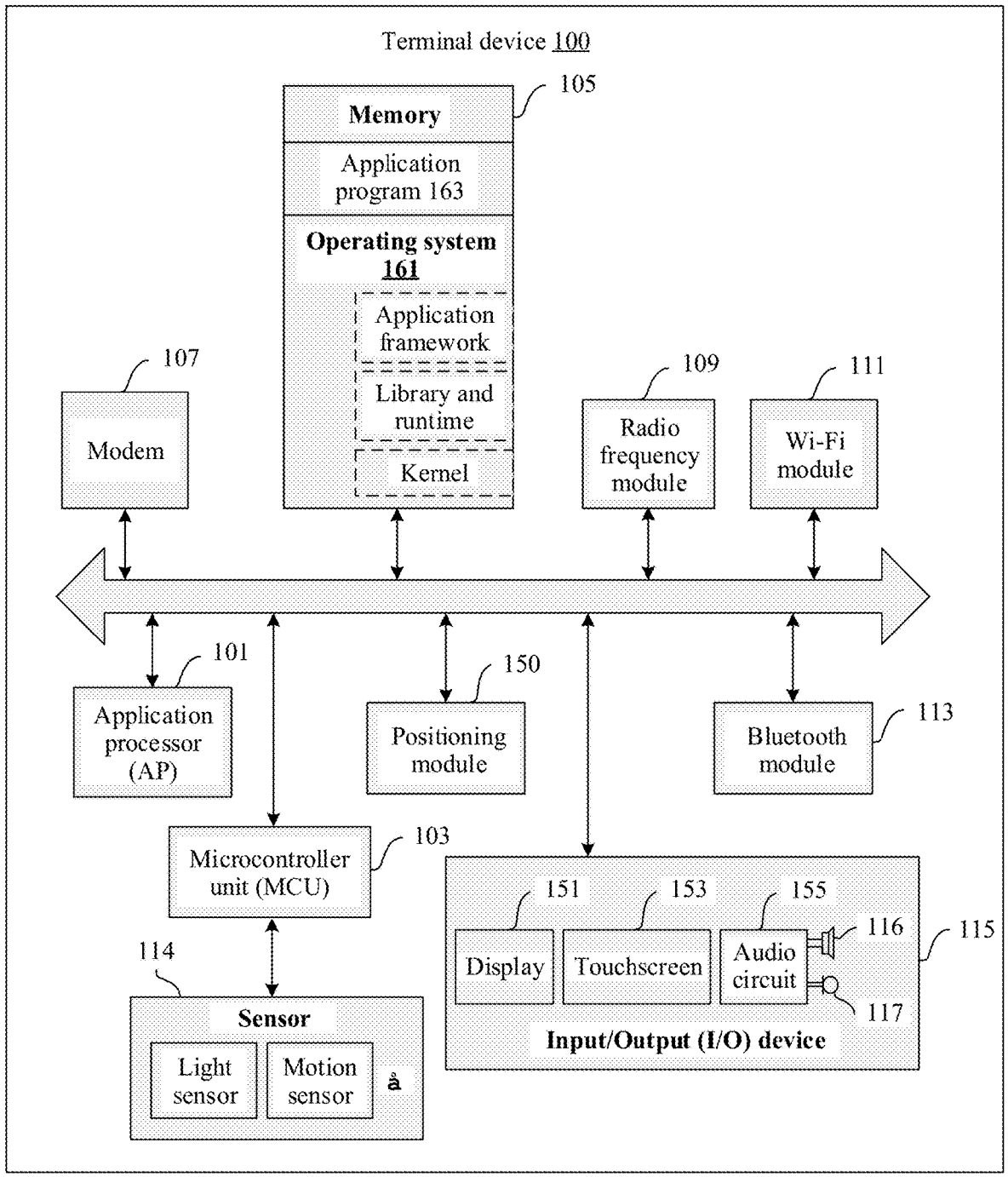
FIG. 2 is a schematic structural diagram of a terminal device according to an embodiment of this application.

FIG. 2 is a schematic structural diagram of an example of a terminal device 100. According to FIG. 2, the terminal device 100 includes components such as an application processor 101, a microcontroller unit (MCU) 103, a memory 105, a modem 107, a radio frequency (RF) module 109, a wireless fidelity (Wi-Fi) module 111, a Bluetooth module 113, a sensor 114, a positioning module 150, and an input/output (I/O) device 115. These components can communicate with each other by using one or more communications buses or signal lines. A person skilled in the art may understand that a hardware structure shown in FIG. 2 does not constitute a limitation on the terminal device, and the terminal device 100 may include more or fewer components than those shown in the figure, may combine some components, or may have a different component arrangement.

The following describes each component of the terminal device 100 in detail with reference to FIG. 2.

The application processor 101 is a control center of the terminal device 100, and is connected to the components of the terminal device 100 through various interfaces and by using various buses. In some embodiments, the application processor 101 may include one or more processing units.

The memory 105 stores a computer program, such as an operating system 161 and an application program 163 that are shown in FIG. 2. The application processor 101 is configured to execute the computer program in the memory 105, to implement a function defined by the computer program. For example, the application processor 101 executes the operating system 161 to implement various functions of the operating system on the terminal device 100. The memory 105 further stores data other than the computer program, for example, data generated in running processes of the operating system 161 and the application program 163. The memory 105 is a non-volatile storage medium, and generally includes an internal storage and an external storage. The internal storage includes but is not limited to a random access memory (RAM), a read-only memory (ROM), a cache, or the like. The external storage includes but is not limited to a flash memory, a hard disk, a compact disc, a universal serial bus (USB) flash drive, and the like. The computer program is usually stored in the external storage. Before executing the computer program, the application processor loads the program from the external storage to the internal storage.

The memory 105 may be independent, and is connected to the application processor 101 by using a bus. Alternatively, the memory 105 and the application processor 101 may be integrated into a chip subsystem.

The MCU 103 is a coprocessor configured to obtain and process data from the sensor 114. A processing capability and power consumption of the MCU 103 are lower than those of the application processor 101, but the MCU 103 has a feature of "always on", and can continuously collect and process the data from the sensor when the application processor 101 is in a sleep mode, to ensure normal running of the sensor with relatively low power consumption. In an embodiment, the MCU 103 may be a sensor hub chip, and the sensor 114 may include a light sensor and a motion sensor. Specifically, the light sensor may include an ambient light sensor and a proximity sensor. The ambient light sensor may be used to adjust luminance of a display 151 based on brightness of ambient light, and when the terminal device 100 approaches an ear, the proximity sensor may power off a display screen. As a type of motion sensor, an accelerometer sensor may detect values of accelerations in various directions (generally three axes), and may detect values and directions of gravity when the accelerometer sensor is still. The sensor 114 may further include another sensor such as a gyroscope, a barometer, a hygrometer, a thermometer, or an infrared sensor. Details are not described herein. The MCU 103 and the sensor 114 may be integrated into a same chip, or may be separate components and are connected by using a bus.

The modem 107 and the radio frequency module 109 constitute a communications subsystem of the terminal device 100, and are configured to implement main functions of a wireless communication standard protocol such as 3GPP or ETSI. The modem 107 is configured to perform coding/decoding, signal modulation/demodulation, equalization, and the like. The radio frequency module 109 is configured to receive and send a radio signal, and the radio frequency module 109 includes but is not limited to an antenna, at least one amplifier, a coupler, a duplexer, and the like. The radio frequency module 109 cooperates with the modem 107 to implement a wireless communication function. The modem 107 may be used as an independent chip, or may be combined with another chip or circuit to form a system-level chip or an integrated circuit. These chips or integrated circuits may be applied to all terminal devices that implement the wireless communication function, including a mobile phone, a computer, a notebook computer, a tablet computer, a router, a wearable device, a vehicle, a household appliance, and the like.

The terminal device 100 may further perform wireless communication by using the Wi-Fi module 111, the Bluetooth module 113, and the like. The Wi-Fi module 111 is configured to provide, for the terminal device 100, network access that complies with a Wi-Fi related standard protocol. The terminal device 100 may access a Wi-Fi access point by using the Wi-Fi module 111, to access the internet. In some other embodiments, the Wi-Fi module 111 may alternatively be used as a Wi-Fi access point, and may provide Wi-Fi network access for another terminal device. The Bluetooth module 113 is configured to implement short-range communication between the terminal device 100 and another terminal device (for example, a mobile phone or a smartwatch). The Wi-Fi module 111 in this embodiment of this application may be an integrated circuit, a Wi-Fi chip, or the like, and the Bluetooth module 113 may be an integrated circuit, a Bluetooth chip, or the like.

The positioning module 150 is configured to determine a geographical location of the terminal device 100. It may be understood that the positioning module 150 may be specifically a receiver of a positioning system such as a global positioning system (GPS), a BeiDou navigation satellite system, or a GLONASS in Russia.

The Wi-Fi module 111, the Bluetooth module 113, and the positioning module 150 may be independent chips or integrated circuits, or may be integrated together. For example, in an embodiment, the Wi-Fi module 111, the Bluetooth module 113, and the positioning module 150 may be integrated into a same chip. In another embodiment, the Wi-Fi module 111, the Bluetooth module 113, the positioning module 150, and the MCU 103 may also be integrated into a same chip.

The input/output device 115 includes but is not limited to the display 151, a touchscreen 153, an audio circuit 155, and the like.

The touchscreen 153 may collect a touch event of a user of the terminal device 100 on or near the touchscreen 153 (for example, an operation performed by the user on the touchscreen 153 or near the touchscreen 153 by using any suitable object such as a finger or a stylus), and sends the collected touch event to another component (for example, the application processor 101). The operation performed by the user near the touchscreen 153 may be referred to as a floating touch. Through the floating touch, the user may select, move, or drag a target (for example, an icon) without directly touching the touchscreen 153. In addition, the touchscreen 153 may be implemented by using a plurality of types such as a resistive type, a capacitive type, an infrared type, and a surface acoustic wave type.

The display (also referred to as a display screen) 151 is configured to display information input by the user or information displayed to the user. The display may be configured in a form such as a liquid crystal display screen or an organic light-emitting diode. The touchscreen 153 may cover the display 151. After detecting a touch event, the touchscreen 153 transmits the touch event to the application processor 101 to determine a type of the touch event, and then the application processor 101 may provide corresponding visual output on the display 151 based on the type of the touch event. In FIG. 2, the touchscreen 153 and the display 151 are used as two independent components to implement input and output functions of the terminal device 100. However, in some embodiments, the touchscreen 153 and the display 151 may be integrated to implement the input and output functions of the terminal device 100. In addition, the touchscreen 153 and the display 151 may be disposed on the front of the terminal device 100 in a full panel form, to implement a bezel-less structure.

The audio circuit 155, a loudspeaker 116, and a microphone 117 may provide an audio interface between the user and the terminal device 100. The audio circuit 155 may convert received audio data into an electrical signal and then transmit a converted electrical signal to the loudspeaker 116, and the loudspeaker 116 converts the electrical signal into a sound signal for output. In addition, the microphone 117 converts a collected sound signal into an electrical signal, and the audio circuit 155 receives the electrical signal, converts the electrical signal into audio data, and then sends the audio data to for example, another terminal device by using the modem 107 and the radio frequency module 109, or outputs the audio data to the memory 105 for further processing.

In addition, the terminal device 100 may further have a fingerprint recognition function. For example, a fingerprint collection component may be configured on the back of the terminal device 100 (for example, a lower part of a rear-facing camera), or a fingerprint collection component may be configured on the front of the terminal device 100 (for example, a lower part of the touchscreen 153). For another example, a fingerprint collection component may be configured in the touchscreen 153 to implement the fingerprint recognition function. To be specific, the fingerprint collection component may be integrated with the touchscreen 153 to implement the fingerprint recognition function of the terminal device 100. In this case, the fingerprint collection component is configured on the touchscreen 153, and may be a part of the touchscreen 153, or may be configured on the touchscreen 153 in another manner. A main component of the fingerprint collection component in this embodiment of this application is a fingerprint sensor. Any type of sensing technology may be used for the fingerprint sensor, including but not limited to an optical sensing technology, a capacitive sensing technology, a piezoelectric sensing technology, an ultrasonic sensing technology, or the like.

Further, the operating system 161 used in the terminal device 100 may be iOS®, Android®, Microsoft®, or another operating system. This is not limited in this embodiment of this application.

Figure 3:
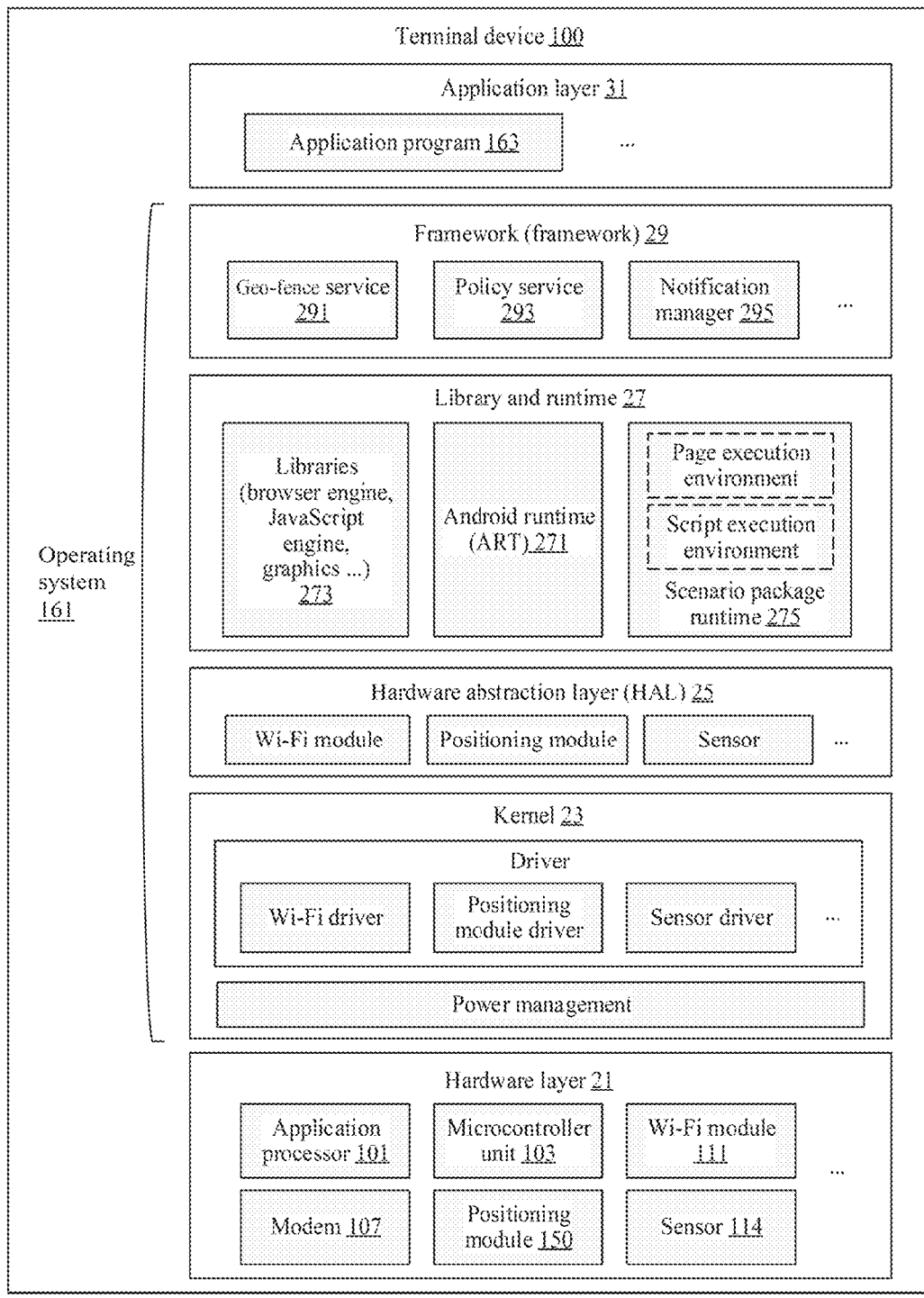
FIG. 3 is a schematic structural diagram of a terminal device according to an embodiment of this application.

That the terminal device 100 uses the Android® operating system is used as an example. As shown in FIG. 3, the terminal device 100 may be logically divided into a hardware layer 21, an operating system 161, and an application layer 31. The hardware layer 21 includes hardware resources such as the hardware processor 101, the microcontroller unit 103, the modem 107, the Wi-Fi module 111, the sensor 114, and the positioning module 150 that are described above. The application layer 31 includes one or more application programs, for example, an application program 163. The application program 163 may be any type of application program such as a social application, an e-commerce application, or a browser. The operating system 161 is used as software middleware between the hardware layer 21 and the application layer 31, and is a computer program for managing and controlling hardware and software resources.

In an embodiment, the operating system 161 includes a kernel 23, a hardware abstraction layer (HAL) 25, libraries and runtime 27, and a framework 29. The kernel 23 is configured to provide a component and a service for an underlying system, for example, power management, memory management, thread management, and a hardware driver. The hardware driver includes a Wi-Fi driver, a sensor driver, a positioning module driver, and the like. The hardware abstraction layer 25 packages the driver of the kernel, provides an interface for the framework 29, and shields implementation details of a lower layer. The hardware abstraction layer 25 runs in user space, and the driver of the kernel runs in kernel space.

The library and runtime 27 are also referred to as a runtime library, and provide a required library file and a required execution environment for an executable program during running. In an embodiment, the library and runtime 27 includes an Android runtime (ART) 271, a library 273, and a scenario package runtime 275. The ART 271 is a virtual machine or virtual machine instance that can convert bytecode of an application program into machine code. The library 273 is a program library that provides support for the executable program during running, and includes a browser engine (for example, the WebKit), a script execution engine (for example, a JavaScript engine), a graphics processing engine, and the like. The scenario package runtime 275 is a running environment of a scenario package, and mainly includes a page execution environment (page context) and a script execution environment (script context). The page execution environment invokes a corresponding function library to parse page code in an HTML, CSS, or another format, and the script execution environment invokes a corresponding function library to parse and execute code or an executable file implemented by a script language such as JavaScript.

The framework 29 is configured to provide various basic common components and services, such as window management and location management, for an application program in the application layer 31. In an embodiment, the framework 29 includes a geo-fence service 291, a policy service 293, a notification manager 295, and the like.

All functions of components of the foregoing operating system 161 may be implemented by the application processor 101 by executing the program stored in the memory 105.

A person skilled in the art may understand that the terminal device 100 may include fewer or more components than those shown in FIG. 3. The terminal device shown in FIG. 3 merely includes components more related to a plurality of implementations disclosed in the embodiments of this application.

A service open platform 200 includes hardware resources such as a processor, a memory, and a communications interface, and system software and application software that run on the hardware resources. A hardware resource of the service open platform 200 may be a hardware resource of one server, or may be a hardware resource pool obtained by abstracting hardware resources of a plurality of servers by using a virtualization technology. This is not particularly limited in this embodiment of this application. The service open platform 200 provides functions such as scenario package hosting, orchestration, and management. These functions may be specifically implemented by hardware and/or software of the service open platform 200, for example, may be implemented by the processor of the service open platform by running a computer program in the memory.

Figure 4:
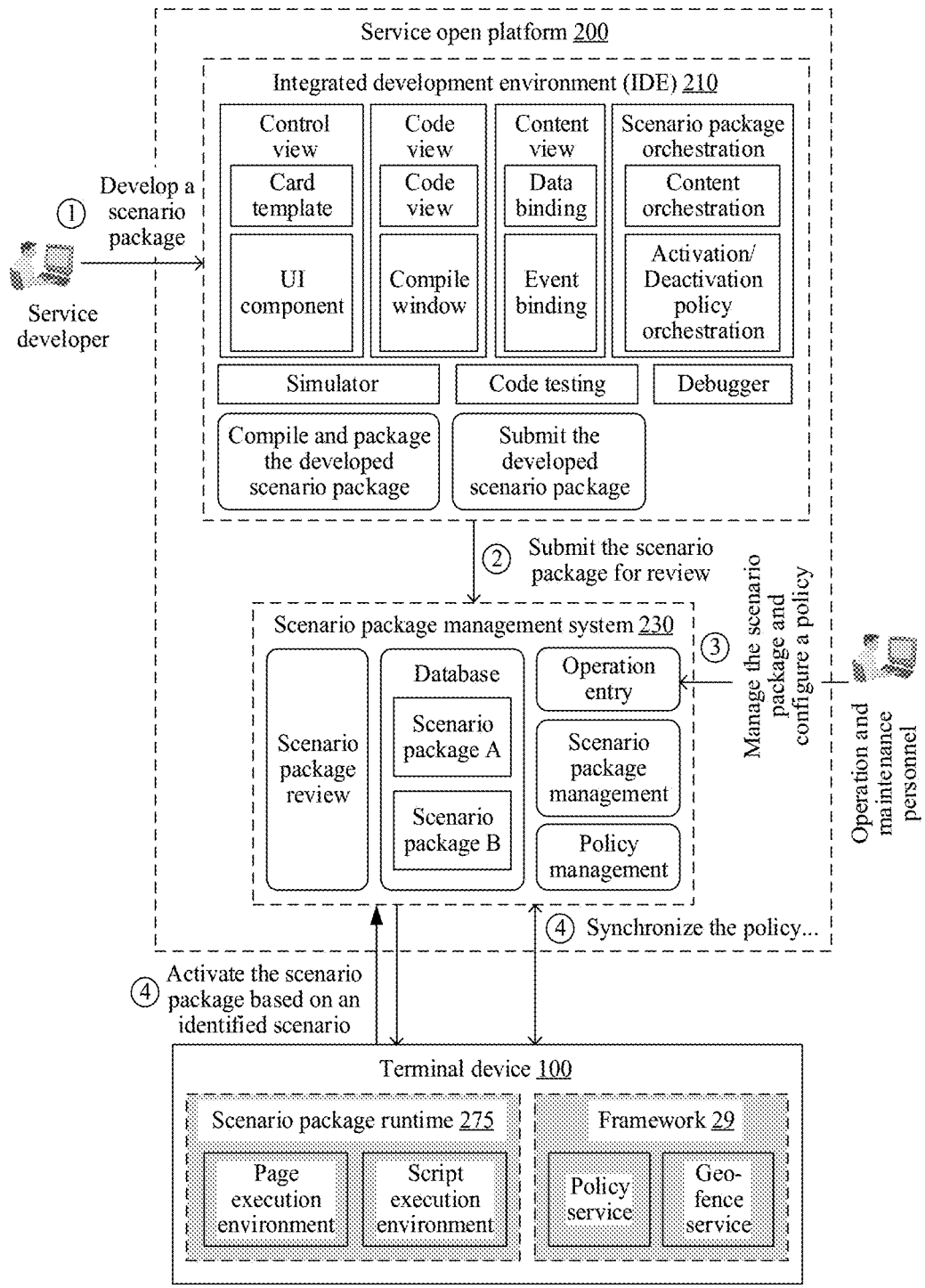
FIG. 4 is a schematic structural diagram of a service open platform according to an embodiment of this application.

In an embodiment, as shown in FIG. 4, a service open platform 200 includes an integrated development environment (IDE) 210 and a scenario package management system 230. The IDE 210 is configured to provide a scenario package development environment, including tools such as a code compiler, a debugger, a code test, a graphic control, and a scenario package orchestrator. A service developer logs in to the IDE 210 by using an entry provided by the IDE 210, for example, a web portal, uses a tool provided by the IDE 210 to develop a scenario package for a specific user scenario, and submits the developed scenario package to the scenario package management system 230. After logging in to the scenario package management system 230, operation and maintenance personnel of the service open platform 200 review, according to a specified rule, the scenario package submitted by the developer, and store the approved scenario package in a scenario package database.

Figure 5:
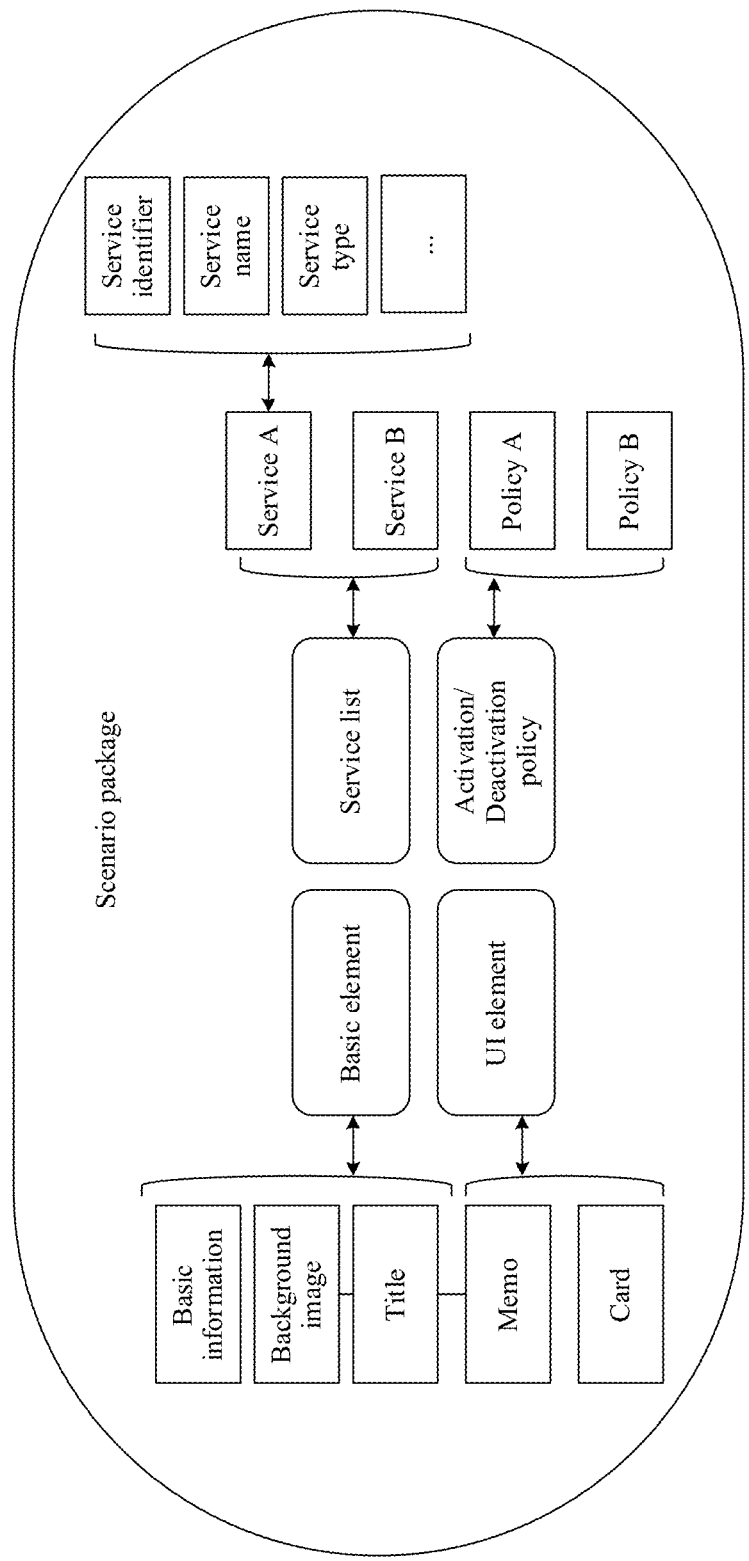
FIG. 5 is a schematic diagram of scenario packet data according to an embodiment of this application.

A scenario package is a service set that is developed for a specific scenario (such as a scenic spot, school, subway station, or airport), and that may be used by a user of a terminal device in the specific scenario. Services in the service set are all direct services and can be used immediately without installation. In an embodiment, as shown in FIG. 5, a scenario package includes a basic element (basic information, a background image, a title, and the like), a user interface (UI) element (an image, a card, and the like), a service list, and a scenario package activation/deactivation policy. The service list includes a plurality of services, and each service includes information such as a service identifier, a service name, and a service type. The scenario package activation/deactivation policy indicates a condition for activating and exiting the scenario package.

Further, the operation and maintenance personnel may further manage the scenario package by using the scenario package management system 230, for example, delete or update the scenario package, or configure or update the scenario package activation/deactivation policy. The scenario package activation/deactivation policy is synchronized to a terminal device 100. The terminal device 100 identifies a user scenario in real time or periodically, and activates the scenario package or exits the activated scenario package based on the identified scenario and according to the scenario package activation/deactivation policy. For example, the scenario package activation/deactivation policy may be: activating the scenario package when the terminal device enters a first area, and exiting the scenario package when the terminal device leaves a first area. Correspondingly, if the terminal device 100 identifies that a current user scenario represents that the terminal device 100 has entered the first area, the terminal device 100 activates the scenario package. A process of activating the scenario package mainly includes requesting the scenario package from the service open platform 200 and running the scenario package by using the scenario package runtime 275 of the terminal device 100.

According to the service providing method provided in the embodiments of this application, a scenario package including a plurality of direct services is developed and managed based on the user scenario. The terminal device perceives the user scenario in real time, and dynamically activates the scenario package based on the user scenario and a policy. Therefore, the terminal device can provide differentiated services or service combinations for the user in different user scenarios. In this case, an effect of "services automatically targeting and acquiring users" is achieved, and the user does not need to actively search for and request a service. In this way, smart experience of the terminal device is improved.

The service providing method provided in the embodiments of this application may be performed by properly combining software, hardware, and/or firmware of the terminal device 100 and software, hardware, and/or firmware of the service open platform 200. For example, on a terminal device, the method may be implemented by combining the operating system 161 shown in FIG. 2 and FIG. 3 and necessary hardware. On a service open platform side, functions of the IDE 210 and the scenario package management system 230 may be implemented by combining software of the service open platform 200 and necessary hardware, for example, may be implemented by at least one processor included in the service open platform 200 by running an executable program in a memory.

Figure 6:
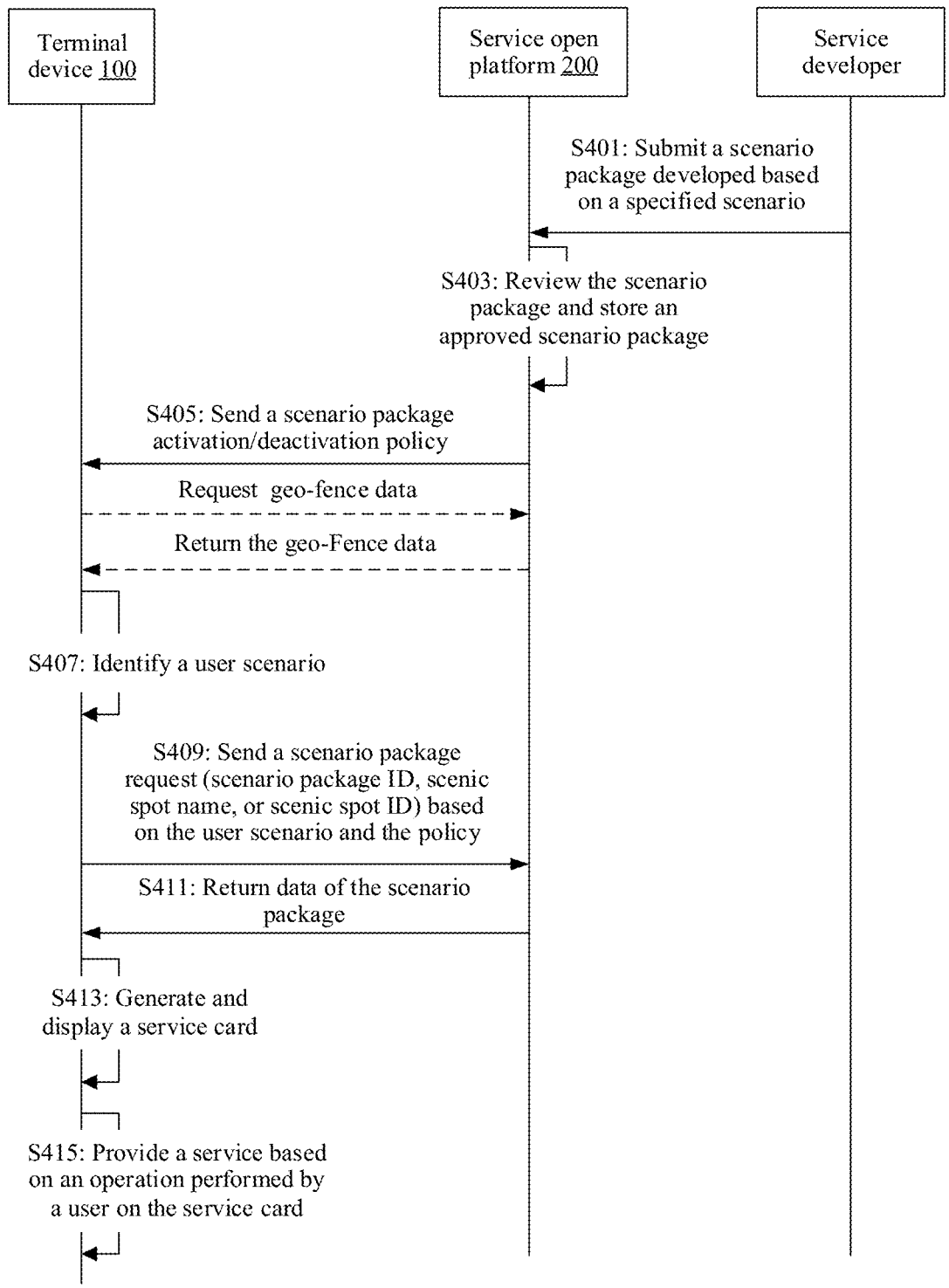
FIG. 6 is a schematic flowchart of a service providing method according to an embodiment of this application.

Based on the device-cloud synergy system described above, the following further describes a more detailed procedure of the service providing method in the embodiments of this application. As shown in FIG. 6, a service providing method in an embodiment of this application mainly includes the following steps.

S401: A developer develops a scenario package based on a specified scenario, and submits the developed scenario package to a service open platform 200. As described in the foregoing embodiment, the developer may use an IDE 210 provided by the service open platform 200 to develop and submit the scenario package.

S403: A scenario package management system 230 of the service open platform 200 reviews the submitted scenario package, and if the submitted scenario package is approved, stores the approved scenario package in a scenario package database. Specifically, the scenario package management system 230 may automatically review the scenario package according to a rule configured by operation and maintenance personnel. Alternatively, the scenario package management system 230 may provide a review interface for operation and maintenance personnel, and the operation and maintenance personnel review the scenario package online through the review interface.

S405: The service open platform 200 sends a scenario package activation/deactivation policy to a terminal device 100, where the policy indicates a condition that needs to be met to activate and exit the scenario package. The scenario package activation/deactivation policy may be configured by the operation and maintenance personnel, may be defined by the service developer when developing the scenario package, or may be obtained by the operation and maintenance personnel by modifying a scenario package activation/deactivation policy defined in the scenario package. This is not particularly limited in this embodiment of this application. The scenario package activation/deactivation policy is related to a user scenario, for example, related to a location of the terminal device or a device connected to the terminal device.

S407: The terminal device 100 identifies the user scenario, where the user scenario is related to the location of the terminal device or an area in which the terminal device 100 is located, or is related to a device currently connected to the terminal device 100. For example, the user scenario may indicate that the terminal device is currently located in an area, or is currently connected to a specific device. When the user scenario is related to the location of the terminal device or the area in which the terminal device is located, the user scenario may be represented by an identifier of the location or the area, for example, an area name, location coordinates, or a keyword. When the user scenario is related to the device connected to the terminal device, the user scenario may be represented by an identifier of the connected device, for example, a device name or a device type. In an embodiment, when the terminal device enters an area, a name, coordinates, or a keyword that identifies the area is a current user scenario, for example, a place name or a building name. When the terminal device is connected to another device, a name or a type of the another device is a current user scenario.

S409: The terminal device 100 sends a scenario package request to the service open platform 200 when determining, based on the identified user scenario and the scenario package activation policy sent by the service open platform 200, that the user scenario meets a scenario package activation condition. The scenario package request includes a scenario package ID generated by the terminal device 100 based on the identified user scenario. For example, the scenario package ID may be a place name, a city name, a scenic spot name, or another keyword or identifier that can be used by the service open platform 200 for query to determine the scenario package.

S411: In response to the scenario package request, the service open platform 200 determines a scenario package corresponding to the scenario package ID, and returns data of the scenario package to the terminal device 100.

S413: The terminal device 100 generates a service card based on the received data of the scenario package, and displays the service card by using a display 151. The service card includes a user interface of at least one service in the scenario package.

S415: The terminal device 100 provides a service for a user based on an operation performed by the user on the service card. For example, a first service is provided in response to a tapping/clicking operation performed by the user on a user interface of the first service in the service card.

In an embodiment, a service included in the scenario package is a public information guidance service, including but not limited to scenario guidance, a scenario map, and a third-party service for the scenario. The scenario guidance is used to provide a user with an assistance service such as scenario introduction or information prompt for a specific scenario. The scenario map is a map service for a specific scenario such as a specific area, and includes but is not limited to an outdoor map, an indoor map, a floor map, a 3D map, and the like. The third-party service includes a value-added service developed by a third-party service provider for a specific scenario, for example, a hotel service or a taxi service.

Figure 7:
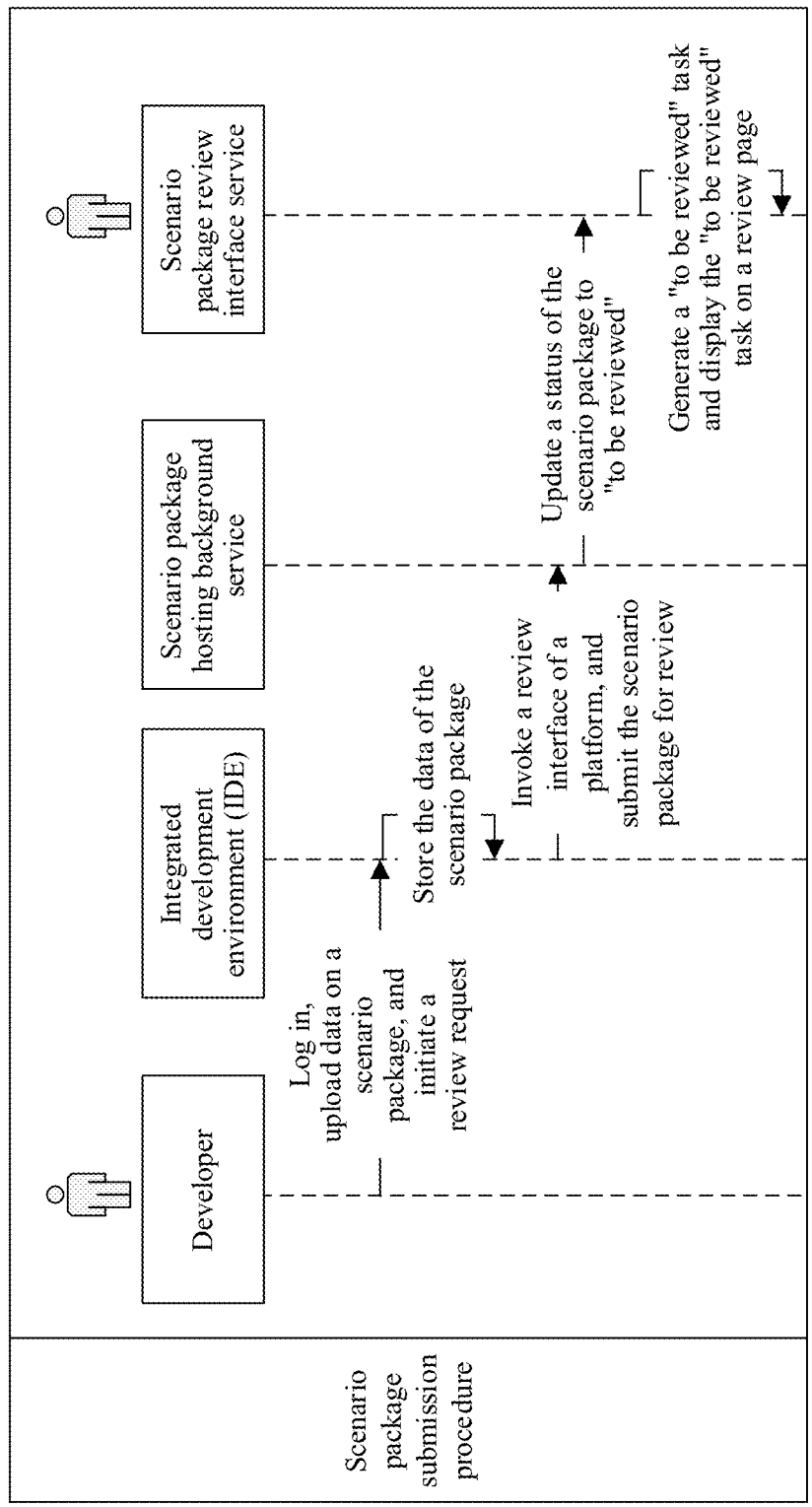
FIG. 7 is a schematic diagram of a scenario package submitting procedure according to an embodiment of this application.

In an embodiment, a scenario package submission procedure in step S401 is shown in FIG. 7. The service developer logs in to the IDE 210 of the service open platform 200 by using an entry, for example, a web portal, provided by the IDE, to develop the scenario package, and uploads the data of the scenario package and initiates a scenario package review request. The IDE 210 buffers the data of the scenario package developed by the developer, and invokes a review interface of the service open platform 200 to submit data of the scenario package to a scenario package hosting background service for review. The scenario package hosting background service updates a status of the scenario package to "to be reviewed". Correspondingly, a scenario package review interface service also generates and displays a "to be reviewed" task for viewing by an reviewer of the service open platform 200. Both the scenario package hosting background service and the scenario package review interface service are services provided by the scenario package management system 230.

Figure 8:
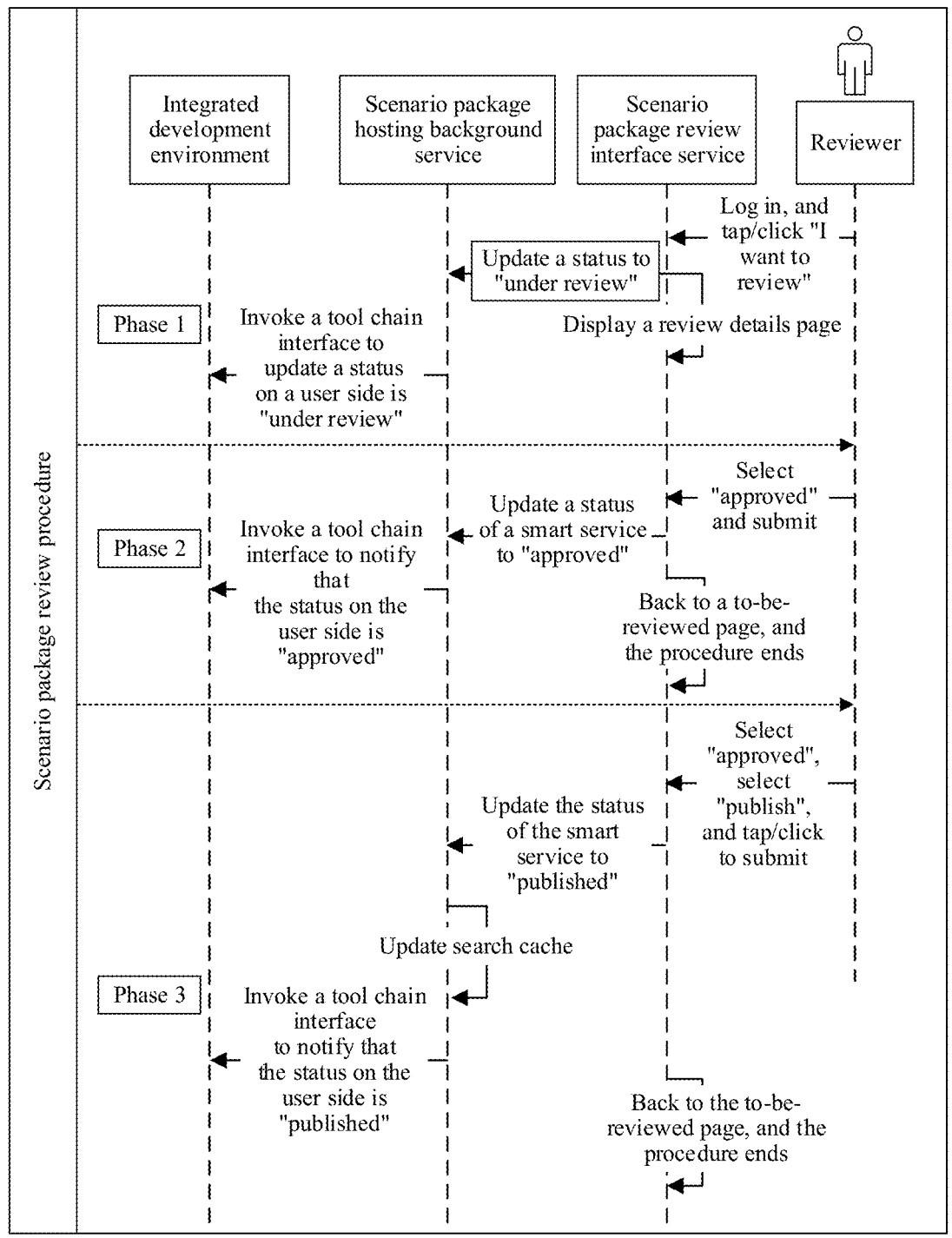
FIG. 8 is a schematic diagram of a scenario package review procedure according to an embodiment of this application.

In an embodiment, a scenario package review procedure in step S403 is shown in FIG. 8. After logging in to the scenario package management system 230, an reviewer enters a scenario package review page. After the reviewer taps/clicks "a to-be-reviewed task", a scenario package review interface service displays a review details page. A status of the scenario package in a scenario package hosting background service is updated to "under review", and the status of the scenario package in the IDE 210 is also updated to "under review". After the reviewer completes review of the scenario package according to a specified rule, and selects and submits "approved" on the review page, the status of the scenario package is updated to "approved". Further, after the reviewer selects to publish the scenario package, the status of the scenario package is also correspondingly updated.

In an embodiment, the data of the scenario package that is received by the terminal device 100 in step S413 includes code corresponding to a service in the scenario package, for example, code developed by using a programming language such as HTML or JavaScript and used to implement a function corresponding to the service. The service card is generated and displayed by using the display 151, where the service card includes the user interface of the at least one service in the scenario package. A page execution environment and a script execution environment in a scenario package runtime 275 parse and execute the code by invoking related function libraries, to display the service card.

In one case, the user scenario is related to the location of the terminal device 100, or the user scenario indicates the location of the terminal device or the area in which the terminal device is located. The scenario package activation/ deactivation policy sent by the service open platform 200 to the terminal device 100 is also related to the location of the terminal device. For example, when the terminal device is located in a first area, the terminal device activates a first scenario package; when the terminal device is located in a second area, the terminal device activates a second scenario package; when leaving a first area, the terminal device exits a first scenario package; or when leaving a second area, the terminal device exits a second scenario package. Correspondingly, the terminal device 100 determines, by determining the location of the terminal device, whether to activate a scenario package and which scenario package is to be activated. In this case, identifying the user scenario in step S407 includes identifying the location of the terminal device or the area in which the terminal device is located. To be specific, the user scenario represents the location of the terminal device or the area in which the terminal device is located. In this embodiment of this application, a plurality of manners of identifying the location of the terminal device are provided. In an embodiment, the terminal device may enable a positioning module such as a GPS, to determine a geographical location of the terminal device. An advantage of this positioning method is that positioning is relatively accurate, but this positioning method has a problem that power consumption is relatively high. However, power of the terminal device is usually very limited, and therefore a user usually actively disables the positioning module. Therefore, it may be difficult to perceive the location of the terminal device in real time. In view of this, an embodiment of this application further provides another positioning method. A base station fingerprint database is constructed to determine a location of a terminal device or an area in which a terminal device is located with extremely low power consumption overheads. The base station fingerprint database is an information base that includes a cell ID of a base station and geographical location information of the base station.

Figure 9:
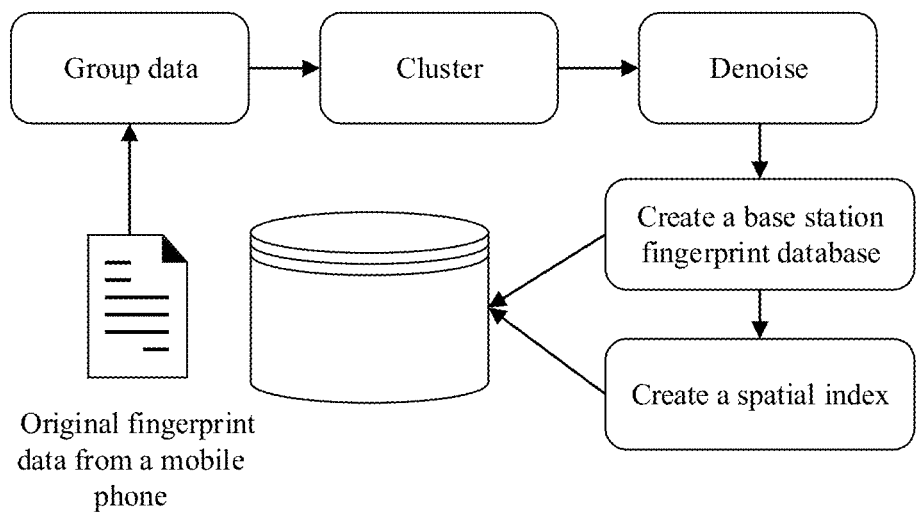
FIG. 9 is a schematic diagram of a process of constructing a base station fingerprint database according to an embodiment of this application.

Specifically, as shown in FIG. 9, a main process of constructing a base station fingerprint database is as follows.

First, fingerprint data (including geographical location information, operator identifiers, and the like) of a plurality of mobile phones connected to a plurality of base stations are collected, and collected fingerprint data is grouped according to a specific rule, for example, the fingerprint data is grouped based on cell IDs, to obtain all fingerprint data associated with each base station. Then, clustering and denoising are performed on the fingerprint data associated with each base station, to determine a coverage area of the base station. Typically, the clustering operation may be implemented by using a spatial relationship clustering algorithm such as KMeans++ or DBSCAN. After the foregoing processing, information such as the coverage area of each base station and the cell IDs may be determined. Finally, the base station fingerprint database is created based on the information, and a corresponding index is created for ease of query. In an embodiment, the base station fingerprint database includes the following information:

| Field name | Meaning |
|---|---|
| ADcode | Administrative code |
| Cell ID | Identifier of a base station |
| LAC | Operator network location block number |
| MCC | Global telecommunications network code |
| MNC | Identifier of an operator, for example, CMCC indicates China Mobile, CUCC indicates China Unicom, and CTC indicates China Telecom |
| RAT | Cell standard code |
| Range | A coverage area (in a GeoJSON format) of a base station, and a spatial index may be created |

For example, a record in the base station fingerprint database is as follows:

```
{
"Adcode": "110000",
" Cell ID ": "000006858",
"LAC": 4185,
"MCC": 460,
"MNC": "CMCC",
"MNCcode": 0,
"RAT": 2,
" Range ": {"type": "Polygon", "coordinates": [[[116.2538792950564,
39.89389004272593], [116.25124672924787, 39.89583141842357], [116.24550559021893,
39.904289330033876], [116.24526220495218, 39.90764156954566], [116. 24
116.25989539416902, 39.9141102716092], [116.25998593397186, 39.90241277793547],
[116.25872660583404, 39.89865442160337], [116.2538792950564, 39.89389004272593]]]}
}
```

Further, based on the base station fingerprint database, geo-fence data of a specific area may be created on the service open platform 200. The geo-fence is an area obtained through division based on a geographical location by using a virtual boundary. For example, an area in which a scenic spot, a school, or an airport is located is divided into a geo-fence. The geo-fence data includes a correspondence between an identifier of a geo-fence and a cell ID of a base station that covers the geo-fence. In an embodiment, the geo-fence data includes the following information:

| Field name | Category | Note |
|---|---|---|
| Fence name | Character string | Geo-fence name (for example, a scenic spot name or an airport name) |
| Administrative code | Character string | Code of a city in which the geo-fence is located |
| Fence type | Character string | Indoor or outdoor |
| Fence shape | Character string | Circle or polygon |
| Fence range | Two-dimensional | Spatial coordinate range of the |

| Field name | Category | Note |
| --- | --- | --- |
| | floating-point number array | geo-fence, for example, circle: [[108.974226,34.212672], 581.89] |
| Base station near the fence | Character string array | Cell ID set of the base station near the geo-fence |
| Base station that covers the fence | Character string array | Cell ID set of the base station that covers the geo-fence |

Figure 10:
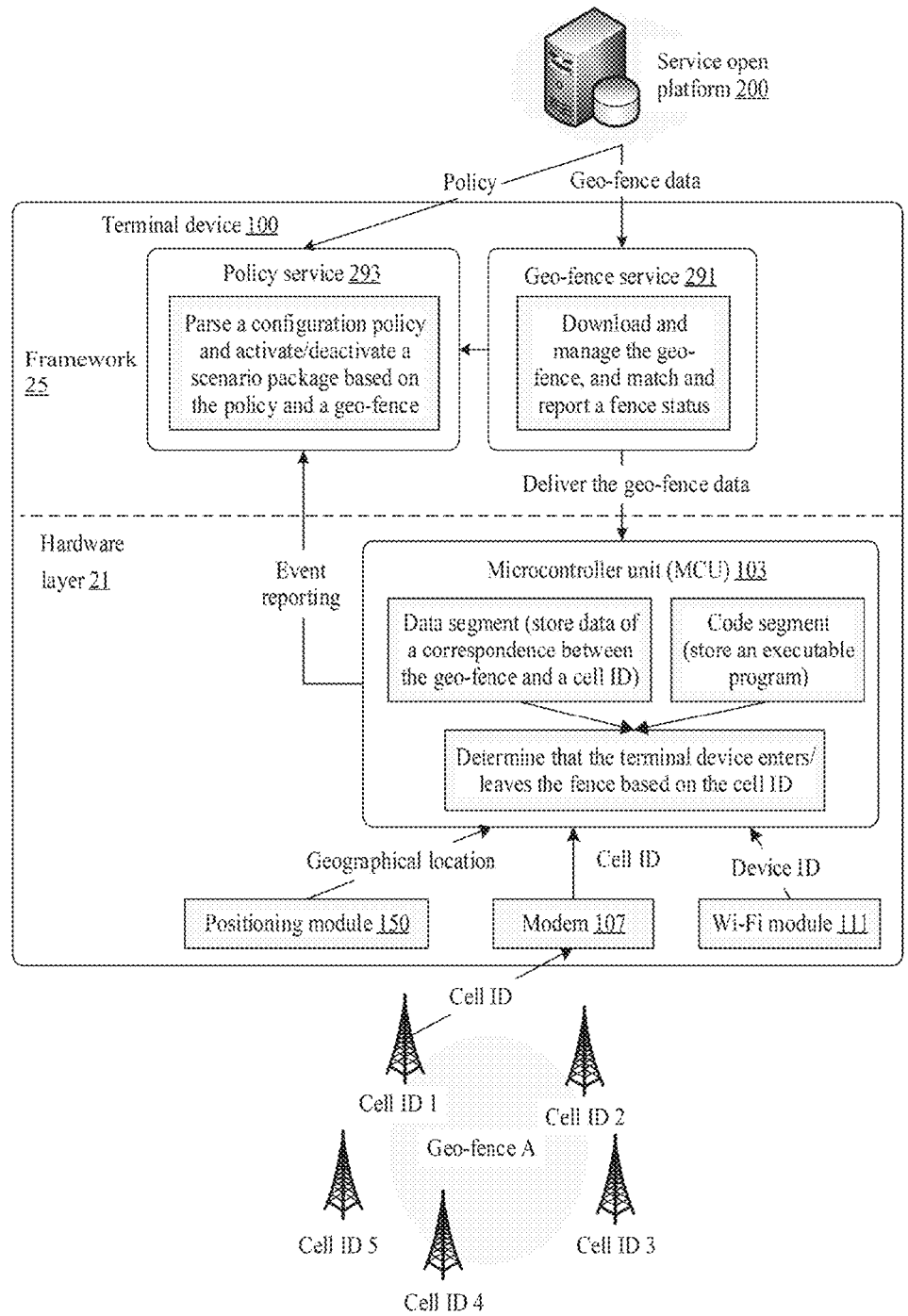
FIG. 10 is a schematic diagram of a process in which a terminal device activates a scenario package based on a scenario according to an embodiment of this application.

FIG. 10 shows an embodiment in which a terminal device 100 perceives a location based on geo-fence data and activates a scenario package. According to FIG. 10, a service open platform 200 delivers the geo-fence data to the terminal device 100. The geo-fence data may be actively pushed by the service open platform 200 to the terminal device 100, or may be sent to the terminal device 100 based on a request initiated by the terminal device 100. A geo-fence service 291 in a framework 25 of the terminal device 100 is responsible for maintaining and managing the geo-fence data received by the terminal device 100. The geo-fence service 291 may buffer some geo-fence data into a memory of an MCU 103. The geo-fence service 291 may alternatively select, according to a specified policy, to buffer some geo-fence data into an MCU 103. This policy may be set by a user of the terminal device 100, or may be delivered by the service open platform. For example, the geo-fence service 291 may buffer, according to a preference setting of the user, geo-fence data of an area that the user is interested in into the MCU 103, or buffer, into the MCU 103, data of a geo-fence near a current location of the terminal device 100. A modem 107 periodically obtains a cell ID of a base station currently connected to the terminal device 100, and periodically reports the obtained cell ID to the MCU 103. The MCU 103 runs a matching algorithm to determine whether the cell ID reported by the modem 107 matches the data of the geo-fence and that is buffered in the MCU 103. If the cell ID reported by the modem 107 matches a cell ID included in the data of the geo-fence, for example, the cell ID reported by the modem is the same as a cell ID of a base station that covers a geo-fence A, it indicates that the terminal device has entered the geo-fence A. Therefore, the MCU 103 reports an event to a policy service 293. If the policy service 293 determines, according to a scenario package activation policy, that the terminal device entering the geo-fence A meets a scenario package activation condition, the policy service 293 activates a corresponding scenario package. A process of activating the scenario package comprises requesting the scenario package data from the service open platform 200, and generating and displaying the service card in steps S409 to S413. Further, if the terminal device leaving the geo-fence A meets a scenario package deactivation condition, the policy service 293 exits the scenario package. Exiting the scenario package includes stopping a service included in the scenario package, for example, closing a thread or a process that runs the scenario package, and exiting a user interface of the scenario package. Optionally, before exiting the scenario package, the policy service 293 may first display a piece of prompt information to the user, and after the user confirms, by performing an operation on the prompt information, to exit the scenario package, the policy service 293 performs an operation of exiting the scenario package.

The geo-fence service 291 and the policy service 293 are components of an operating system 161, and functions of the geo-fence service 291 and the policy service 293 may be implemented by an application processor 101 in a hardware layer 21 by executing an operating system program in a memory 105.

The MCU 103 is a coprocessor other than the application processor 101, and runs with low power consumption when the application processor 101 is sleep. An on-chip memory of the MCU 103 includes a data segment and a code segment. The data segment stores some geo-fence data, for example, the data of the geo-fence corresponding to the area that the user is interested in, or the data of the geo-fence corresponding to the area near the current location of the terminal device. The code segment stores an executable program, and the MCU 103 runs the program in the code segment to implement the foregoing cell ID matching algorithm.

The modem 107 may be a baseband processor and may be implemented as an independent chip, or may be integrated with another chip to form a chip subsystem. For example, the modem 107 may be integrated with the application processor 101.

It should be noted that a period of obtaining the cell ID by the MCU 103 may be the same as or different from a period for reporting the cell ID. If a real-time requirement for scenario recognition is not high, the period of reporting the cell ID by the MCU 103 may be longer than the period of obtaining the cell ID. In this way, a frequency of performing a matching operation by the MCU may be reduced, and power consumption caused by the scenario recognition is further reduced.

Different scenario package activation policies have different requirements for location precision. Some scenario packages are activated on a basis that the terminal device enters a geo-fence, and activating of some scenario packages may depend on a more accurate location of the terminal device. For example, a scenario package is activated when the terminal enters a smaller subarea in the geo-fence, or even based on coordinates of a specific geographical location. For example, in an embodiment, an activation policy of a scenario package A may be defined as: activating the scenario package A after the terminal device enters the geo-fence A, where the geo-fence A may represent a city, a district in a city, or an area with a smaller range. In this case, the terminal device may activate the scenario package A after determining, according to the foregoing cell ID matching method, that the terminal device enters the geo-fence A.

In another embodiment, an activation policy of a scenario package B may be defined as: activating the scenario package B when the terminal device enters a smaller area B such as a building B in a geo-fence B. In this case, positioning with higher precision is required. In this case, as shown in FIG. 10, after determining, based on the cell ID reported by the modem 107, that the terminal device enters the geo-fence B, the MCU 103 of the terminal device 100 further needs to determine whether the terminal device enters the building B. Therefore, the MCU 103 further enables a positioning module 150 to determine a current more accurate geographical location of the terminal device 100, to complete the foregoing determining. In this way, the current location of the terminal device 100 is actually determined through secondary positioning. The first positioning is coarse-grained positioning, and is used to determine whether the terminal device enters a geo-fence. The second positioning is fine-grained positioning, and is used to determine whether the terminal device enters a smaller area in the geo-fence.

The first coarse-grained positioning is implemented by the MCU 103 by matching the cell ID, and the positioning module 150 is required for the second fine-grained positioning. This positioning manner in which the coarse-grained positioning and the fine-grained positioning are combined greatly reduces a time for enabling the positioning module 150, and can locate a location of the terminal device with relatively low power consumption. In this way, a scenario package is further activated based on the location of the terminal device.

Optionally, in an embodiment, the second fine-grained positioning may alternatively be completed by using a Wi-Fi module 111. In this case, after determining, based on the cell ID reported by the modem 107 and the geo-fence data buffered in the MCU 103, that the terminal device 100 enters a geo-fence B, the MCU 103 may enable the Wi-Fi module 111 to determine a more accurate location of the terminal device 100. The MCU 103 may buffer correspondence data that includes a correspondence between an identifier of an area B and a device identifier of a Wi-Fi access point that covers the area B. The Wi-Fi module 111 determines, based on a received Wi-Fi signal, a device identifier of a Wi-Fi access point that sends the Wi-Fi signal, and transmits the obtained device identifier to the MCU 103. If the device identifier of the Wi-Fi access point received by the MCU 103 matches the device identifier in the correspondence data, the MCU 103 determines that the terminal device 100 has entered the area B. Because a signal coverage area of the Wi-Fi access point is far smaller than a coverage area of a base station, the terminal device can also complete the second fine-grained positioning by using the Wi-Fi module 111, to meet a requirement of a scenario package activation policy on a more accurate location of the terminal device. It may be understood that a Bluetooth device is similar to the Wi-Fi access point, and also has a feature of a small signal coverage area. Therefore, the terminal device 100 may also complete the fine-grained positioning by using the Bluetooth module 113. Details are not described herein.

It should be noted that the foregoing positioning method may alternatively be combined in another manner. For example, after determining, based on the cell ID of the base station, the geo-fence in which the terminal device 100 is located, the MCU 103 may first enable the Wi-Fi module 111 to perform fine-grained positioning. If the location of the terminal device still cannot be determined by using the Wi-Fi module 111, the MCU 103 enables the positioning module 150 to perform positioning. In this multi-granularity multi-layer positioning manner, differentiated requirements of different scenario packages for location precision can be met, and power consumption can be effectively reduced.

In another case, the user scenario may be unrelated to the location of the terminal device 100, but is related to the device connected to the terminal device 100. For example, the terminal device 100 is connected to another Bluetooth device, a home gateway, or the like that successfully pairs with the terminal device 100. When the terminal device is connected to the home gateway, it indicates that a current user scenario is a smart home scenario. To be specific, the user may need to control another device in a home local area network by using the terminal device 100. In this case, a scenario package activation/deactivation policy is related to a type and/or an identifier of the device connected to the terminal device. For example, the scenario package is activated after the terminal device is connected to a specific device or a type of device. Correspondingly, identifying the user scenario in step S407 includes identifying the identifier and/or the type of the device connected to the terminal device. In an embodiment, an activation policy of a scenario package A is defined as: activating the scenario package A when the terminal device is successfully connected to a Bluetooth device A; or exiting the scenario package A when the terminal device is disconnected from a Bluetooth device A. Identifying the user scenario in step S407 includes: pairing with and establishing a connection to a Bluetooth device by the terminal device 100 by using the Bluetooth module 113; and determining an identifier, for example, a device name, of the Bluetooth device based on message interaction in a connection establishment process. The identifier of the Bluetooth device may represent the current user scenario. To be specific, the terminal device 100 is currently connected to the Bluetooth device. The Bluetooth module 113 may report a name of the Bluetooth device to the MCU 103. The MCU 103 determines that the name of the Bluetooth device is the same as a name of the Bluetooth device A, and reports an activation event to an operating system, to activate the scenario package A. Further, when the terminal device 100 is disconnected from the Bluetooth device, the Bluetooth module 113 may report an event to the operating system of the terminal device 100, and the operating system exits the scenario package A. It may be understood that the activation policy of the scenario package A may alternatively be related to a type of a Bluetooth device connected to the terminal device. For example, when the device connected to the terminal device is of a specified type, a specified scenario package is activated. A device type and a scenario package corresponding to the device type may be specified by configuring an activation policy. In a specific example, when the terminal device enables the Bluetooth module and successfully connects to a Bluetooth headset by using the Bluetooth module, the terminal device activates a "music" scenario package based on a preset activation condition of the "music" scenario package, to run a music service. When the terminal device is disconnected from the Bluetooth headset, the terminal device exits the "music" scenario package.

A process of "activating the scenario package" described in the foregoing embodiments essentially includes requesting the scenario package from the service open platform 200, receiving data of the scenario package from the service open platform, and generating and displaying a scenario package interface (service card) in steps S409 to S413. The data of the scenario package includes data required for running a service in the scenario package on the terminal device, for example, code or an image written in a language such as HTML or JavaScript. The operating system 161 of the terminal device 100 may display the service card to the user by parsing and executing the code, and provide a corresponding service based on an operation performed by the user on the service card. Specifically, the scenario package runtime 275 of the operating system 161 provides a page execution environment and a script execution environment. The page execution environment parses source code in a format such as html or css by using a corresponding function library, and the script execution environment parses and executes code or an executable file implemented by using a script language such as JavaScript by using a corresponding function library. The terminal device 100 may parse and run a scenario package by using the page execution environment and the script execution environment, to display the service card (scenario package interface) to the user. The service card includes user interfaces of a plurality of services in the scenario package, and the user interface of the service includes but is not limited to one or more of the following: an icon, a shortcut, a thumbnail, and a user guide text.

The following further describes the service providing method in this embodiment of this application from a perspective of a user interface.

Figure 11A:
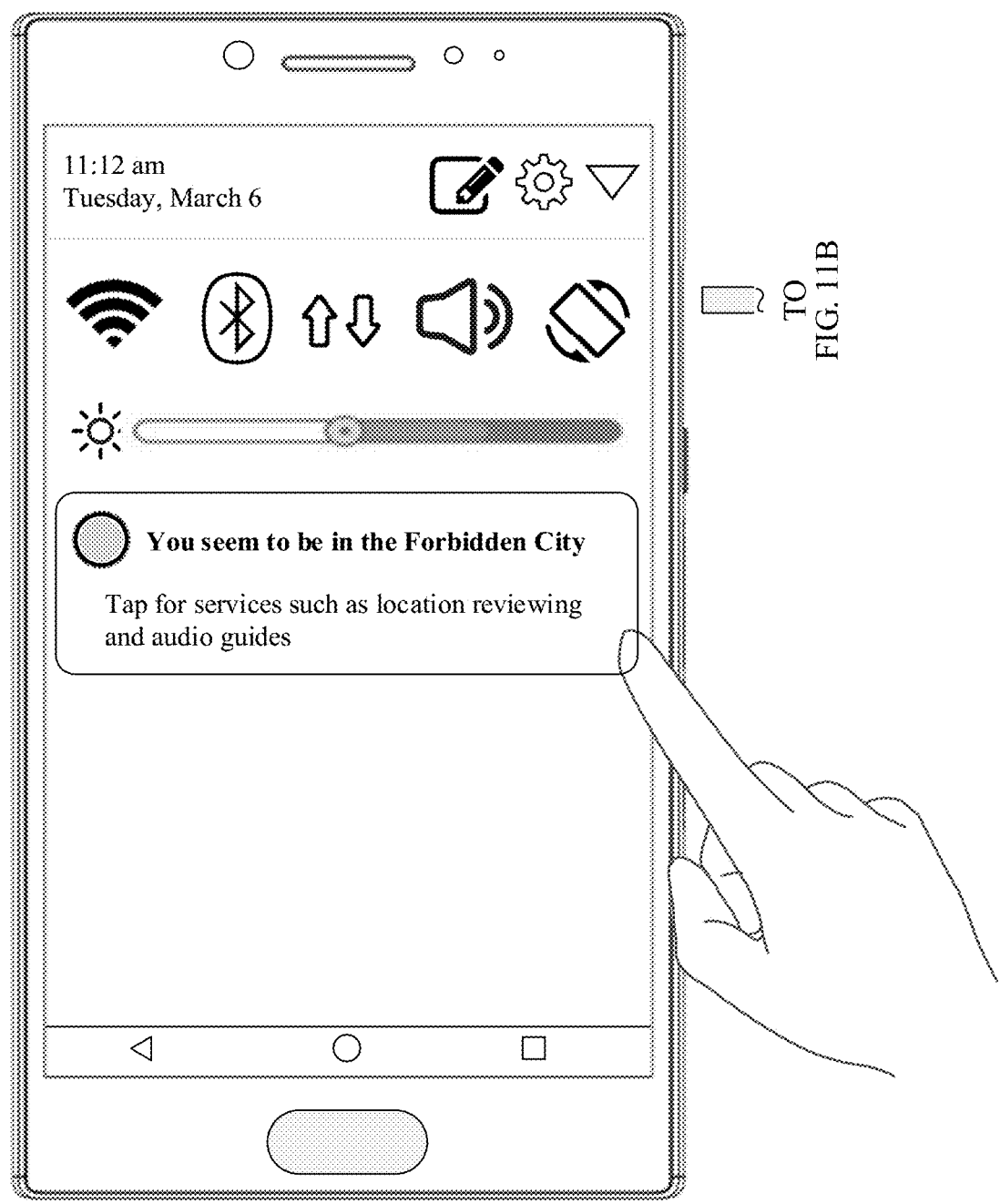
FIG. 11A and FIG. 11B are schematic diagrams of a user interface in a service providing method according to an embodiment of this application.
Figure 11B:
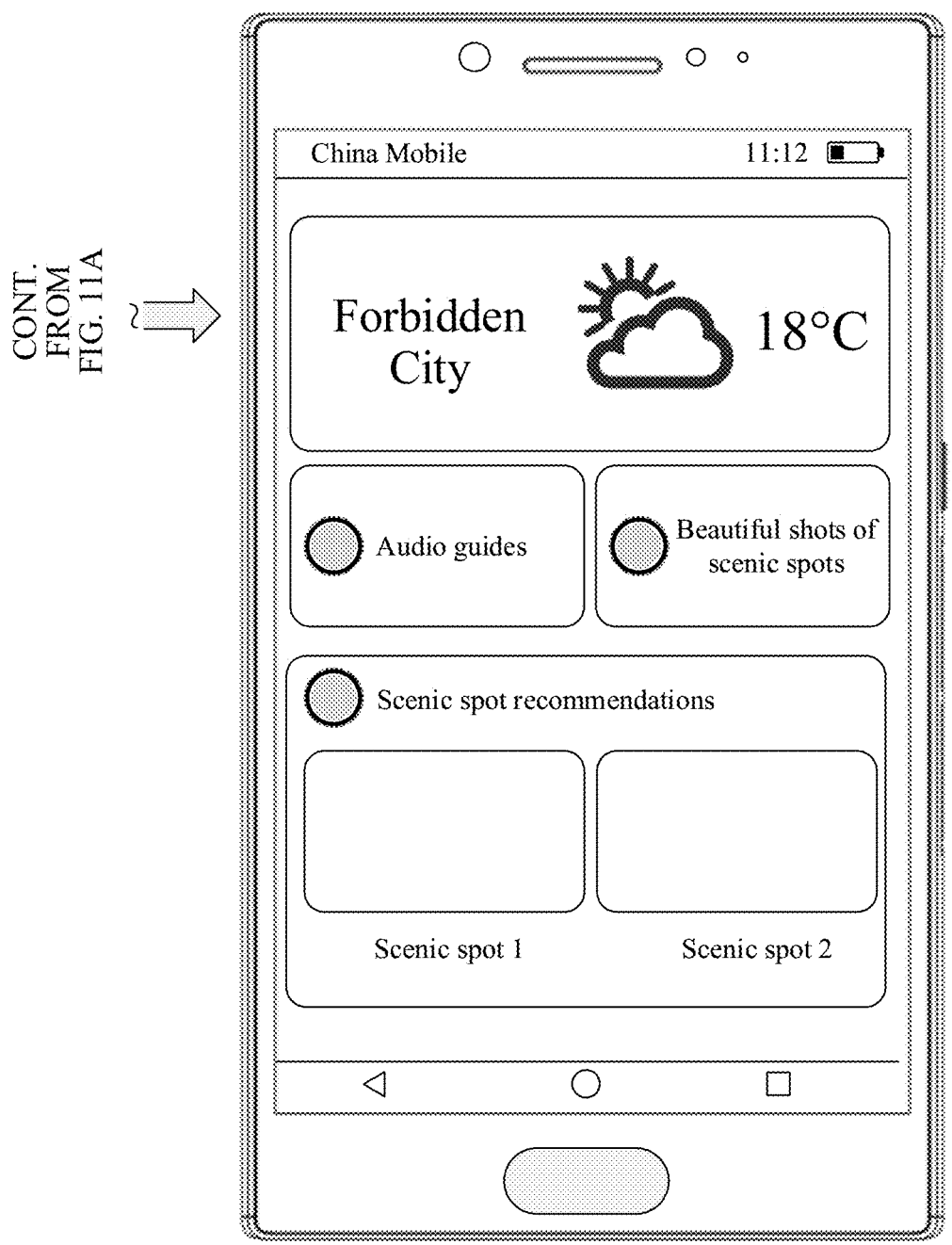

In an embodiment, as shown in FIG. 11A and FIG. 11B, when a terminal device identifies that a current user scenario is that the terminal device has entered a "Forbidden City" scenic spot, and determines, according to a scenario package activation policy, that this scenario meets an activation condition of a "Forbidden City" scenario package, the terminal device generates a scenario package prompt message and displays the scenario package prompt message in a notification bar, to notify a user that there is a scenario package to be activated currently. After the user taps/clicks the scenario package prompt message in the notification bar, the terminal device requests data of the scenario package from a service open platform, and generates a service card based on the data of the scenario package and displays the service card. It can be learned from FIG. 11A and FIG. 11B that the service card includes user interfaces of a plurality of services in the "Forbidden City" scenario package. Further, if the user taps/clicks a user interface of a service in the service card, the service is provided for the user. For example, related content or a related function is provided. The terminal device may identify the current user scenario by using the positioning method described in the foregoing embodiment. Details are not described.

Figure 12A:
FIG. 12A to FIG. 12C are schematic diagrams of a user interface in a service providing method according to an embodiment of this application.
Figure 12B:
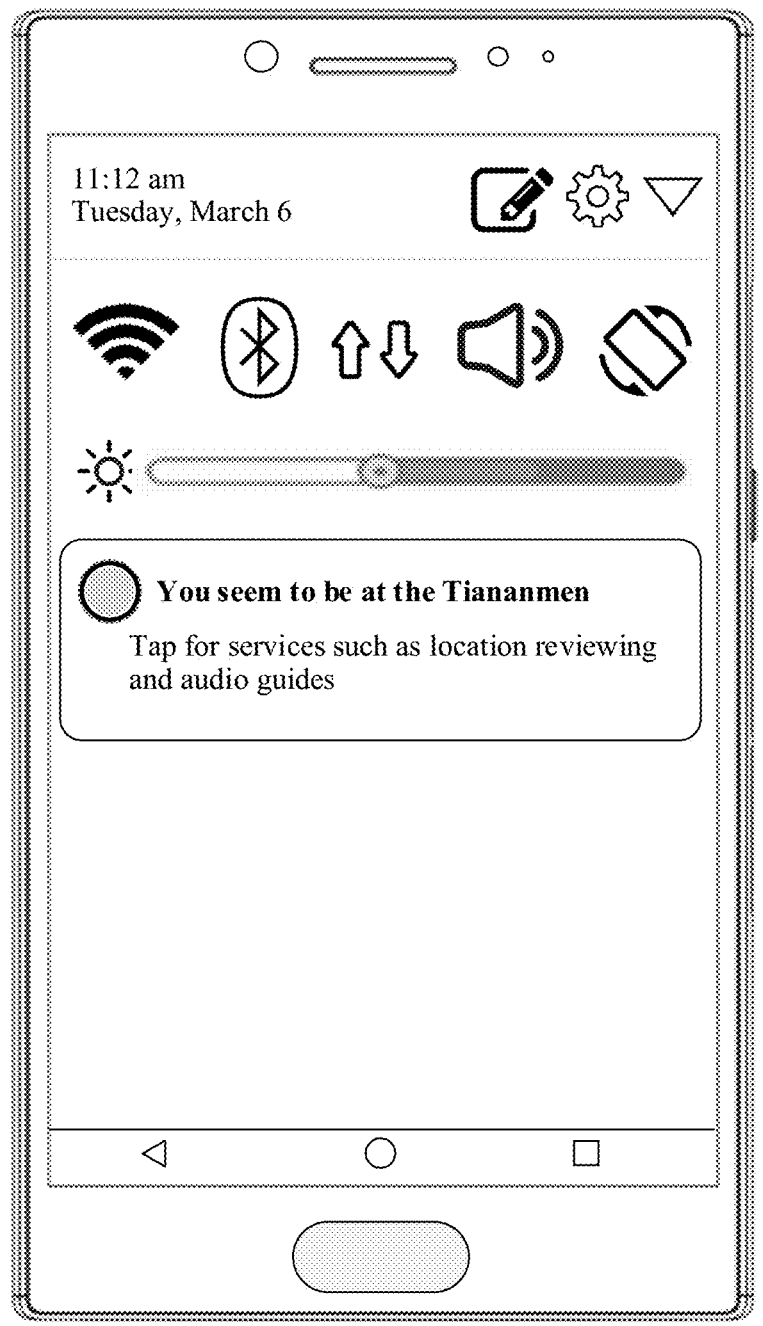
Figure 12C:
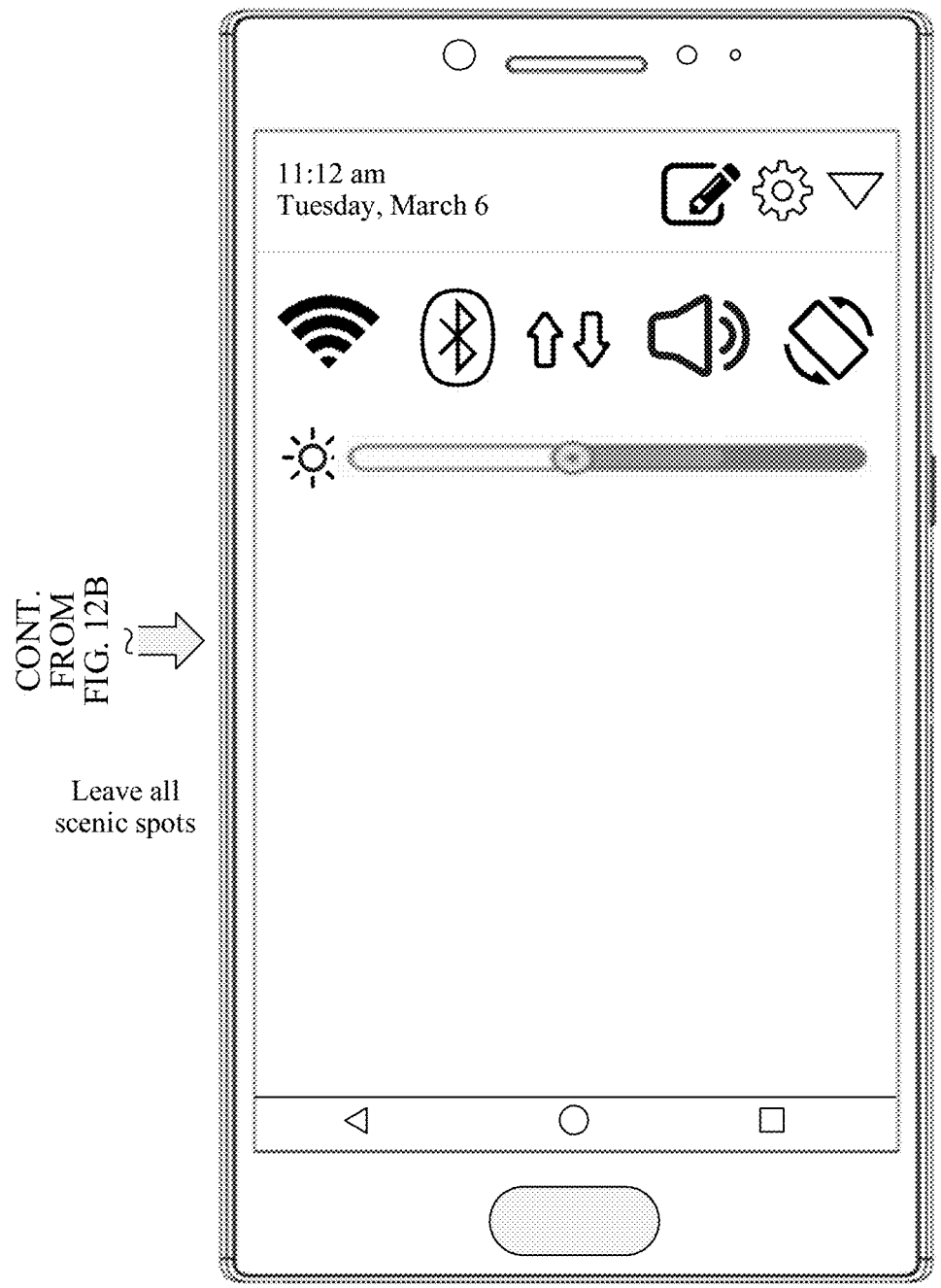

In another embodiment, as shown in FIG. 12A to FIG. 12C, when it is identified that a terminal device leaves a "Forbidden City" scenic spot, the terminal device exits a "Forbidden City" scenario package according to a scenario package deactivation policy, for example, stops displaying a prompt message of the "Forbidden City" scenario package in a notification bar. Further, if it is identified that the terminal device enters another area, for example, a "Tiananmen" scenic spot, and according to a scenario package activation policy, when entering the another area, the terminal device needs to activate another scenario package, for example, a "Tiananmen" scenario package, the terminal device displays a prompt message of the "Tiananmen" scenario package in the notification bar. If the user does not tap/click the prompt message and identifies that the terminal device has left the "Tiananmen" scenic spot, the previously displayed prompt message of the "Tiananmen" scenario package is deleted.

Figure 13A:
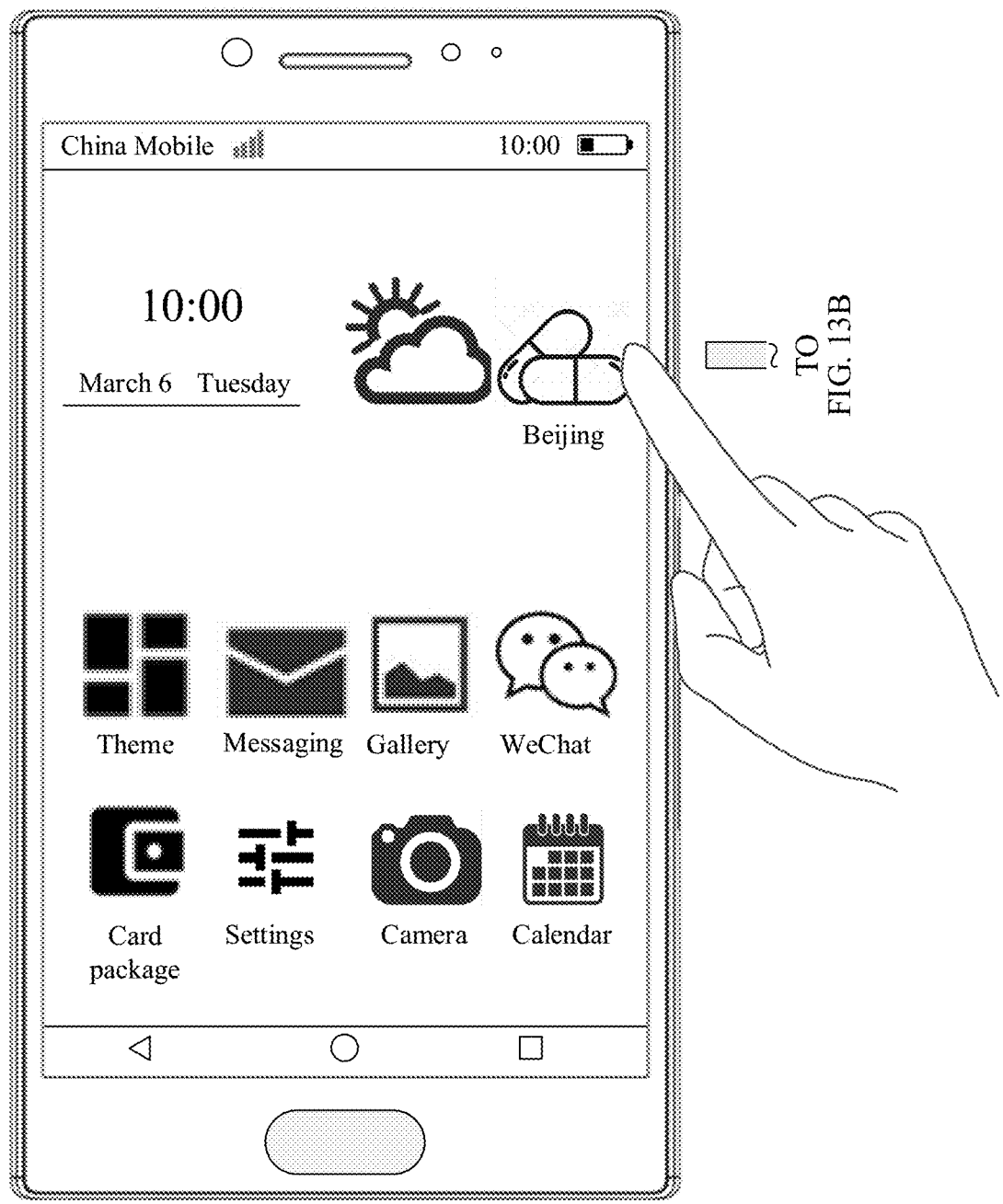
FIG. 13A and FIG. 13B are schematic diagrams of a user interface in a service providing method according to an embodiment of this application.
Figure 13B:
Figure 14A:
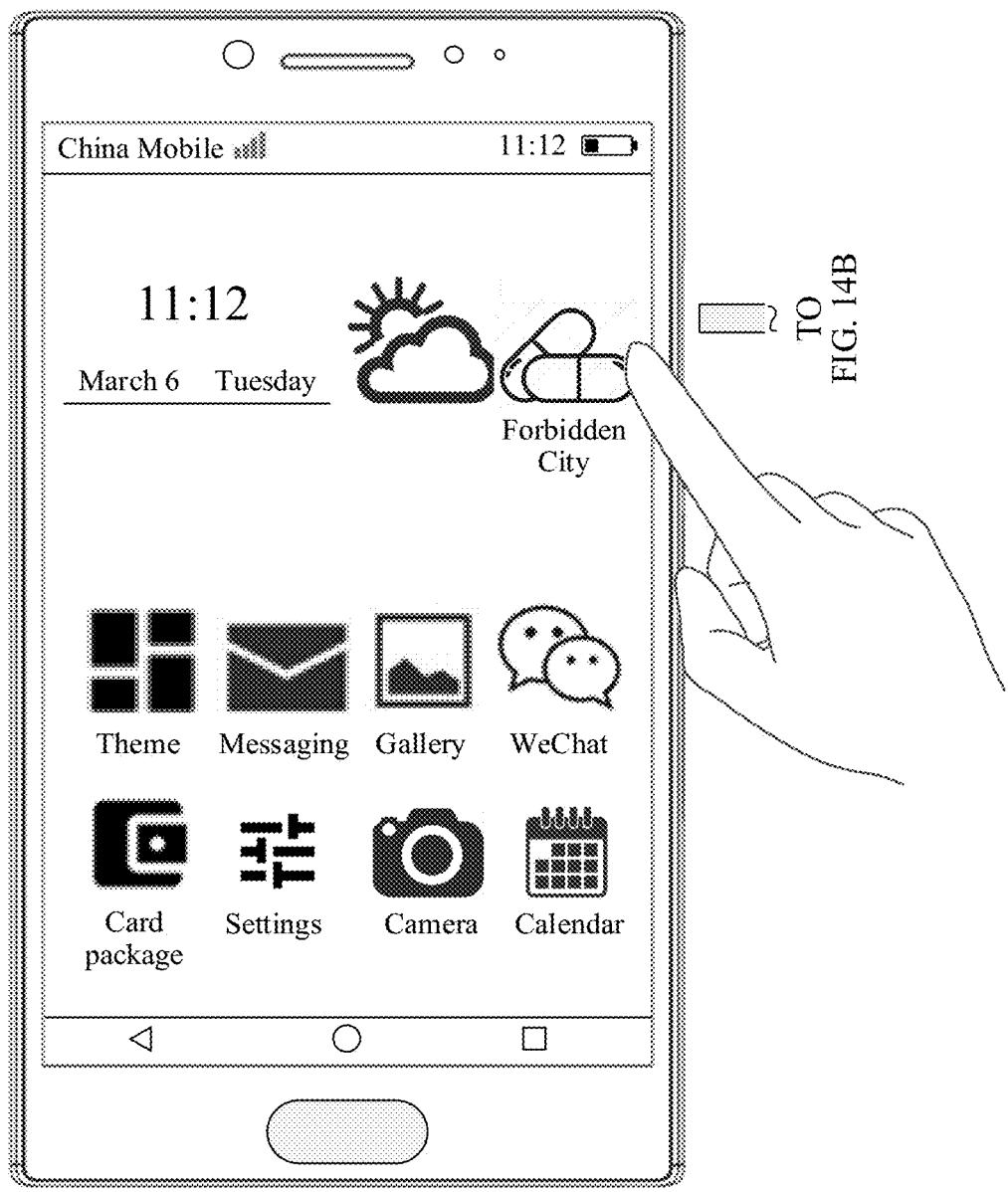
FIG. 14A and FIG. 14B are schematic diagrams of a user interface in a service providing method according to an embodiment of this application.
Figure 14B:
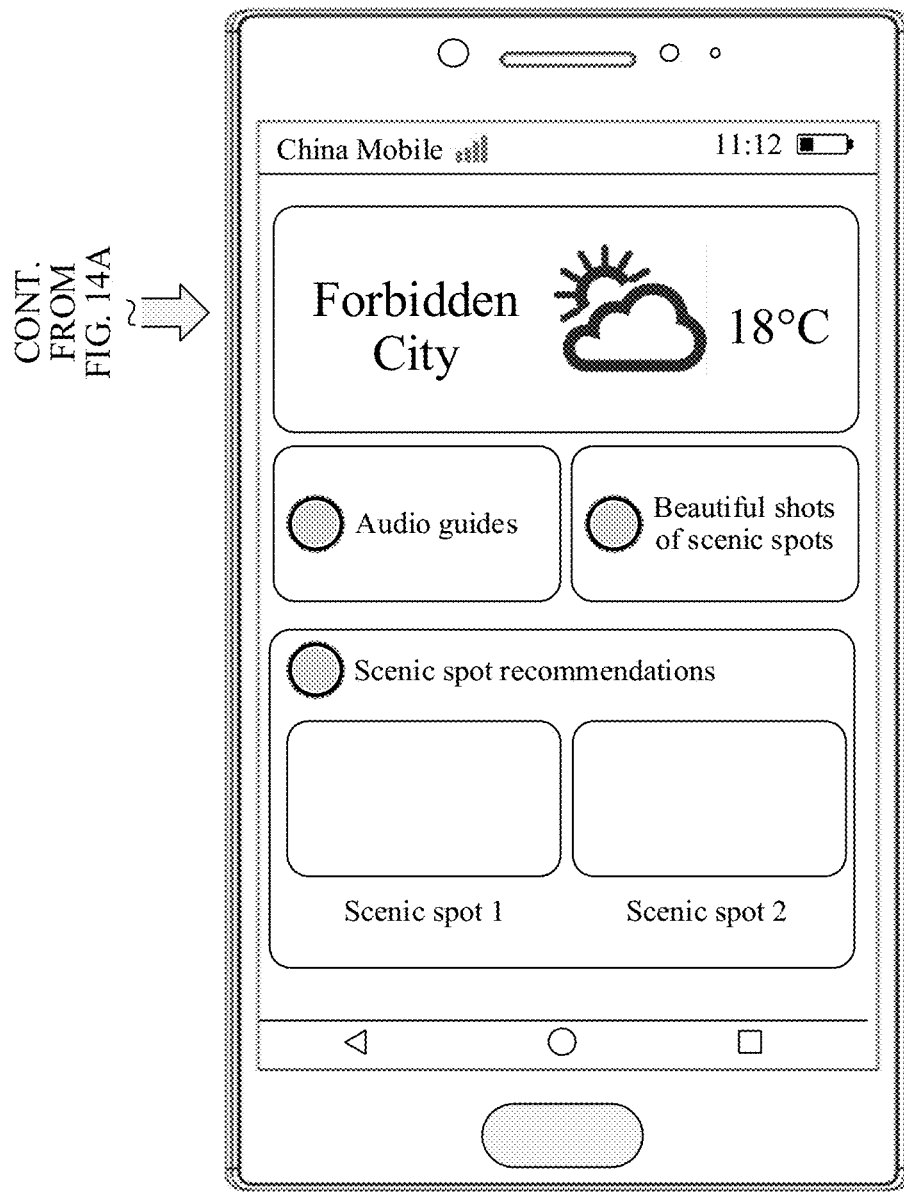

In another embodiment, as shown in FIG. 13A and FIG. 13B, when a terminal device identifies that a current user scenario is that the terminal device has entered the "Beijing" area, and determines, according to a scenario package activation policy, that this scenario meets an activation condition of a "Beijing" scenario package, the terminal device may display an icon (the icon may also be referred to as a "scenario capsule") on a home screen, to notify a user that there is a scenario package to be activated currently. After the user taps/clicks the icon, the terminal device requests data of the "Beijing" scenario package from a service open platform, and generates a service card based on the data of the scenario package and displays the service card. Further, when it is identified that the terminal device enters another area, the terminal device determines, according to a scenario package activation policy, that the terminal device entering another area meets an activation condition of another scenario package, the terminal device displays an icon of the another scenario package on the home screen. After the user taps/clicks the icon, the terminal device requests data of the another scenario package from the service open platform, and generates and displays a corresponding service card, where displayed content of the service card is not completely the same as previously displayed content of the service card. For example, as shown in FIG. 14A and FIG. 14B, when a terminal device enters a "Forbidden City" scenic spot in Beijing, a scenario capsule is updated to a "Forbidden City" scenario capsule, and after a user taps/ clicks the "Forbidden City" scenario capsule, the terminal device displays an interface of a "Forbidden City" scenario package. This interface is different from a previously displayed interface of the "Beijing" scenario package. In this way, differentiated services can be provided for the user based on different locations or areas in which the user is located, so that services are more targeted and smarter.

Figure 15A:
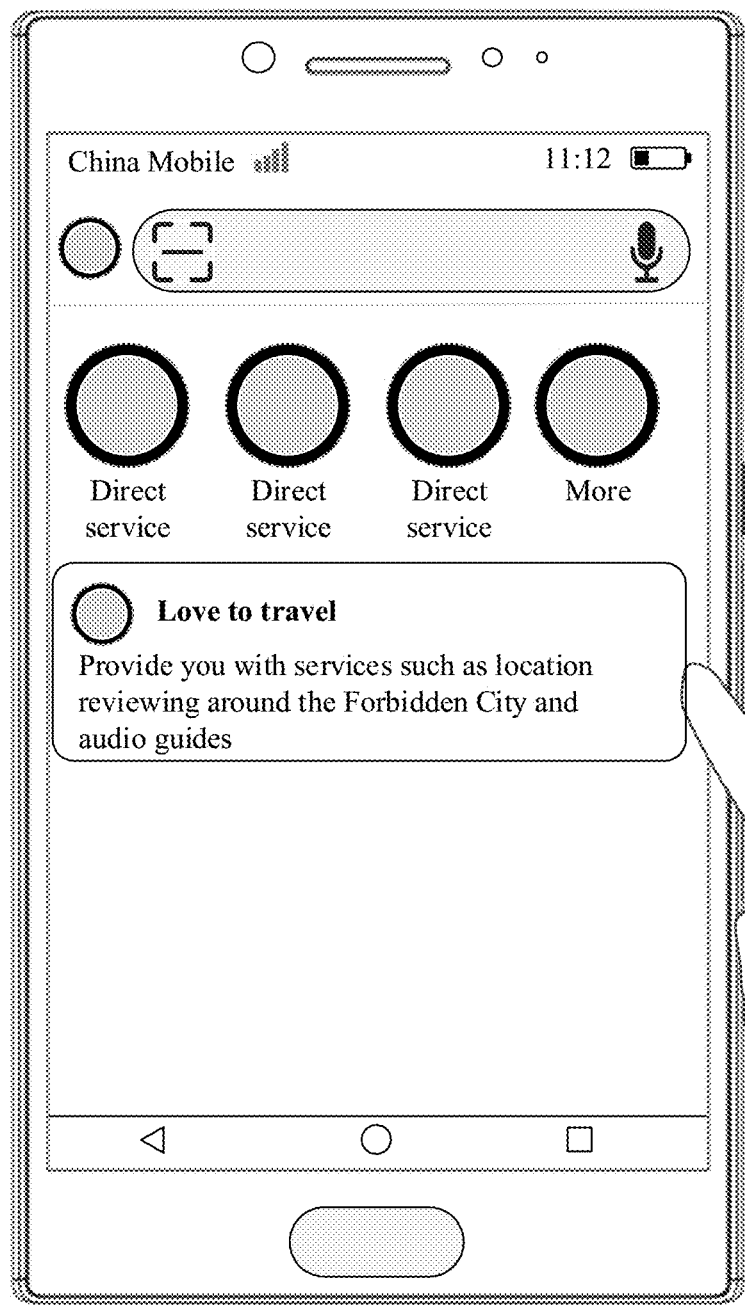
FIG. 15A and FIG. 15B are schematic diagrams of a user interface in a service providing method according to an embodiment of this application.
Figure 15B:
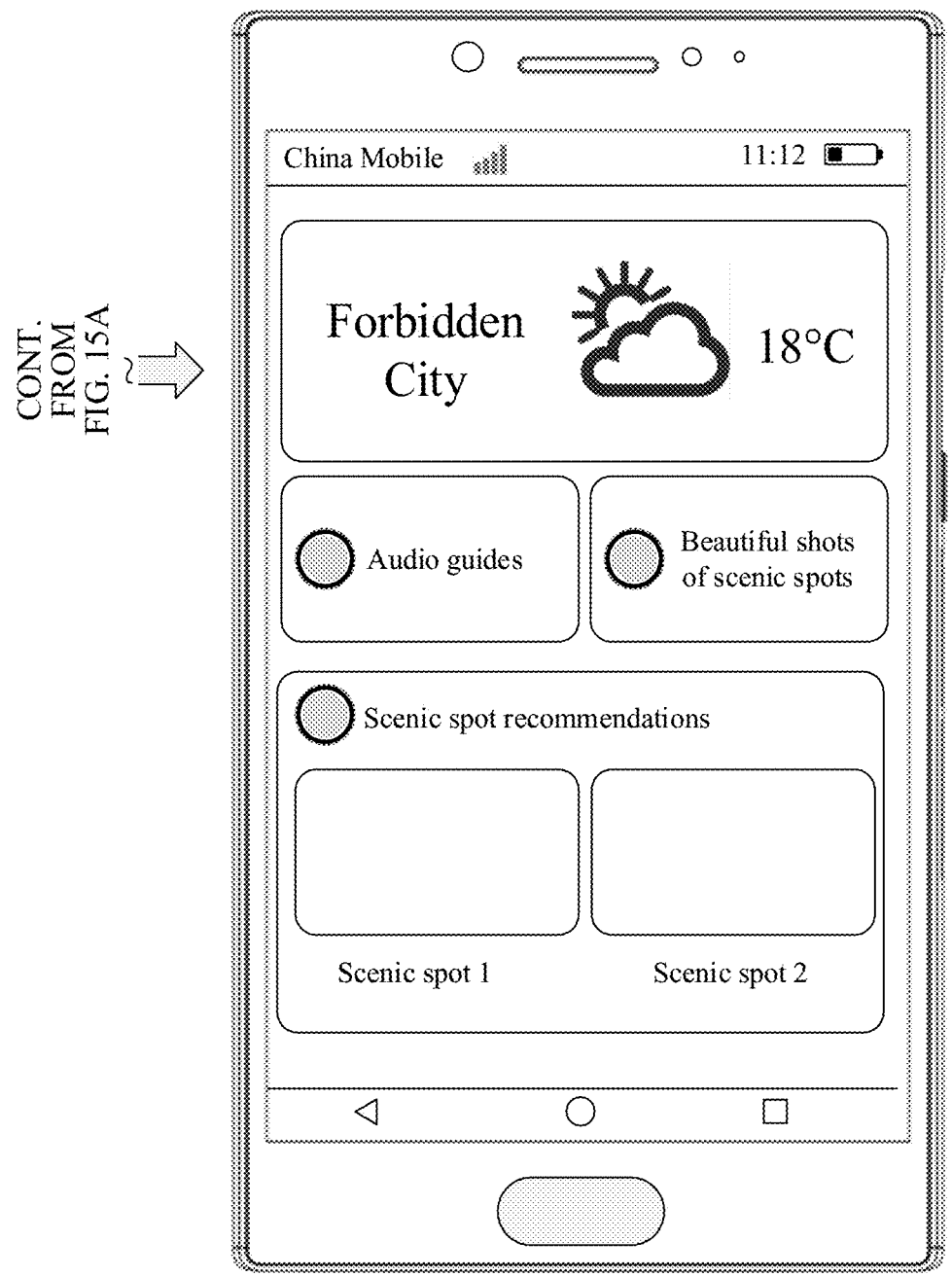

In addition to the notification bar and the home screen, the terminal device may display scenario package prompt information on another user interface. For example, in another embodiment, as shown in FIG. 15A and FIG. 15B, a terminal device may display a prompt message of a scenario package on a HiBoard interface. It may be understood that when an activation condition of the scenario package is met, the terminal device may alternatively display the prompt message of the scenario package on another user interface, for example, a lock screen or an information syndication interface of an information assistant. Details are not described in this embodiment of this application.

In an embodiment, when the terminal device identifies that the current user scenario is that the terminal device is successfully connected to a device whose device type is A, and determines, according to the scenario package activation policy, that this scenario meets an activation condition of a scenario package A, the terminal device generates a scenario package prompt message, to notify a user that there is a scenario package to be activated currently. Based on an operation performed by the user on the scenario package prompt message, the terminal device requests data of the scenario package from a service open platform, and generates a service card based on the data of the scenario package and displays the service card. The service card includes user interfaces of a plurality of services in the scenario package A. Further, if the user taps/clicks a user interface of a service in the service card, the service is provided for the user. For example, related content or a related function is provided. In a specific example, the device type A is a Bluetooth headset, and the scenario package A is a "music" scenario package.

In another embodiment, when the terminal device identifies that the current user scenario is that the terminal device is successfully connected to a device whose device type is B, and determines, according to the scenario package activation policy, that this scenario meets an activation condition of a scenario package B, the terminal device generates a scenario package prompt message, to notify a user that there is a scenario package to be activated currently. Based on an operation performed by the user on the scenario package prompt message, the terminal device requests data of the scenario package from a service open platform, and generates a service card based on the data of the scenario package and displays the service card. The service card includes user interfaces of a plurality of services in the scenario package B. Further, if the user taps/clicks a user interface of a service in the service card, the service is provided for the user. For example, related content or a related function is provided.

Based on the service providing method described in the foregoing embodiments, an embodiment of this application further provides a terminal device 200, including one or more functional units configured to perform the service providing method described in the foregoing embodiments. These functional units may be implemented by software, hardware such as a processor, or a proper combination of software, hardware, and/or firmware. For example, some functions are implemented by an application processor by executing a computer program, and some functions are implemented by a wireless communications module (such as a modem or a Wi-Fi module), an MCU, and a positioning module (such as a GPS module).

Figure 16:
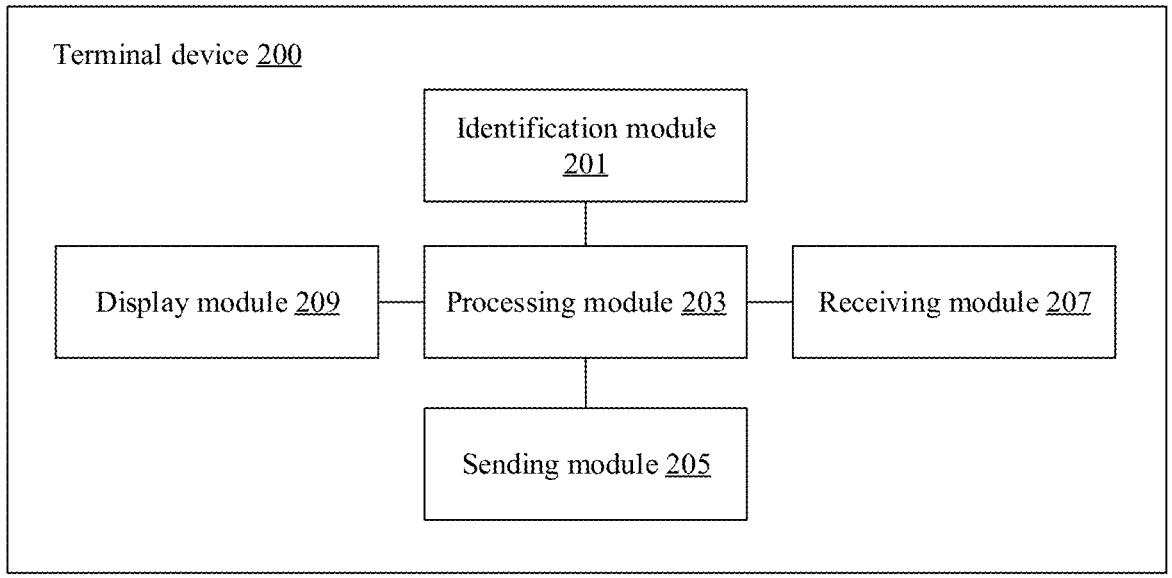
FIG. 16 is a schematic structural diagram of a terminal device according to an embodiment of this application.

In an embodiment, as shown in FIG. 16, the terminal device 200 includes an identification module 201, a processing module 203, a sending module 205, a receiving module 207, and a display module 209. The identification module 201 is configured to identify a current user scenario, where the current user scenario may indicate a location of the terminal device or an area in which the terminal device 200 is currently located, or a name and/or a type of a device currently connected to the terminal device 200. The processing module 203 is configured to: when it is determined, according to a preset scenario package activation policy, that the user scenario identified by the identification module 201 meets an activation condition of a first scenario package, send a scenario package request message to a service open platform by using the sending module 205, where the scenario package request message includes an identification (ID) of the first scenario package, and the first scenario package includes at least one service related to a user scenario. The processing module 203 is further configured to: receive, by using the receiving module 207, data of the first scenario package sent by the service open platform, and generate a service card based on the data and display the service card by using the display module 209. The service card includes a user interface of the at least one service. The processing module 203 is further configured to: provide, in response to an operation performed by a user on the user interface in the service card, a service corresponding to the user interface on which the user performs the operation, for example, display specific content or provide a function.

In an embodiment, the user scenario is related to a location of the terminal device. For example, if the user scenario indicates the location or an area in which the terminal device is located, the identification module 201 is a component having a positioning capability, for example, a positioning module (such as a GPS or a BeiDou positioning system).

In another embodiment, the terminal device 200 stores correspondence data that includes a correspondence between a geographical location of a first area and an identifier of a wireless access point that covers the first area. The identification module 201 is specifically configured to determine, based on an identifier of a wireless access point connected to the terminal device 200 and the correspondence data, a location of the terminal device or an area in which the terminal device 200 is located.

In another embodiment, a function of the identification module 201 may alternatively be implemented by a combination of a plurality of components. For example, the identification module 201 may include a modem and an MCU. In another embodiment, the identification module 201 may include a modem, an MCU, and a Wi-Fi module. In another embodiment, the identification module 201 may include a modem, an MCU, and a Bluetooth module. For a detailed process of determining the location or the area in which the terminal device is located by using a plurality of combinations of the modem, the MCU, the Wi-Fi module, and the Bluetooth module, refer to the foregoing embodiment related to FIG. 10.

In an embodiment, the user scenario is related to a device connected to the terminal device 200. For example, the user scenario indicates an identifier and/or a type of the connected device. In this case, the identification module 201 is a component having a communication function, for example, a Wi-Fi module or a Bluetooth module. After successfully establishing a connection to another device based on a specific communication protocol, the identification module 201 determines, based on message interaction in a connection establishment process, an identifier and/or a type of the connected another device. Correspondingly, the terminal device 200 stores a preconfigured scenario package activation/deactivation policy, and the policy includes: activating a scenario package A when the type of the device connected to the terminal device is A. This policy may be represented by a correspondence between the device type and a scenario package ID. In this way, the processing module 203 may determine, based on a type of a device currently connected to the terminal device 200 and the preconfigured scenario package activation policy, whether to activate the scenario package A. Specifically, when determining that the type of the device currently connected to the terminal device 200 is the same as a device type in the scenario package activation policy, the identification module 201 activates the scenario package A. Further, the scenario package activation/deactivation policy may further include: exiting the scenario package A when the device whose device type is A is disconnected from the terminal device 200. Correspondingly, if the identification module 201 detects that the terminal device 200 is disconnected from the device whose device type is A, the identification module 201 exits the scenario package A. Exiting the scenario package includes stopping providing a service included in the scenario package.

In an embodiment, for specific details of requesting, by the processing module 203, data of a scenario packet and generating a service card, refer to the foregoing embodiments. The processing module 203 may be a processor such as an application processor, and implements a corresponding function by executing a computer program.

In an embodiment, the display module 209 is a display, for example, a liquid crystal display (LCD), or an organic light-emitting diode (OLED) display.

Figure 17:
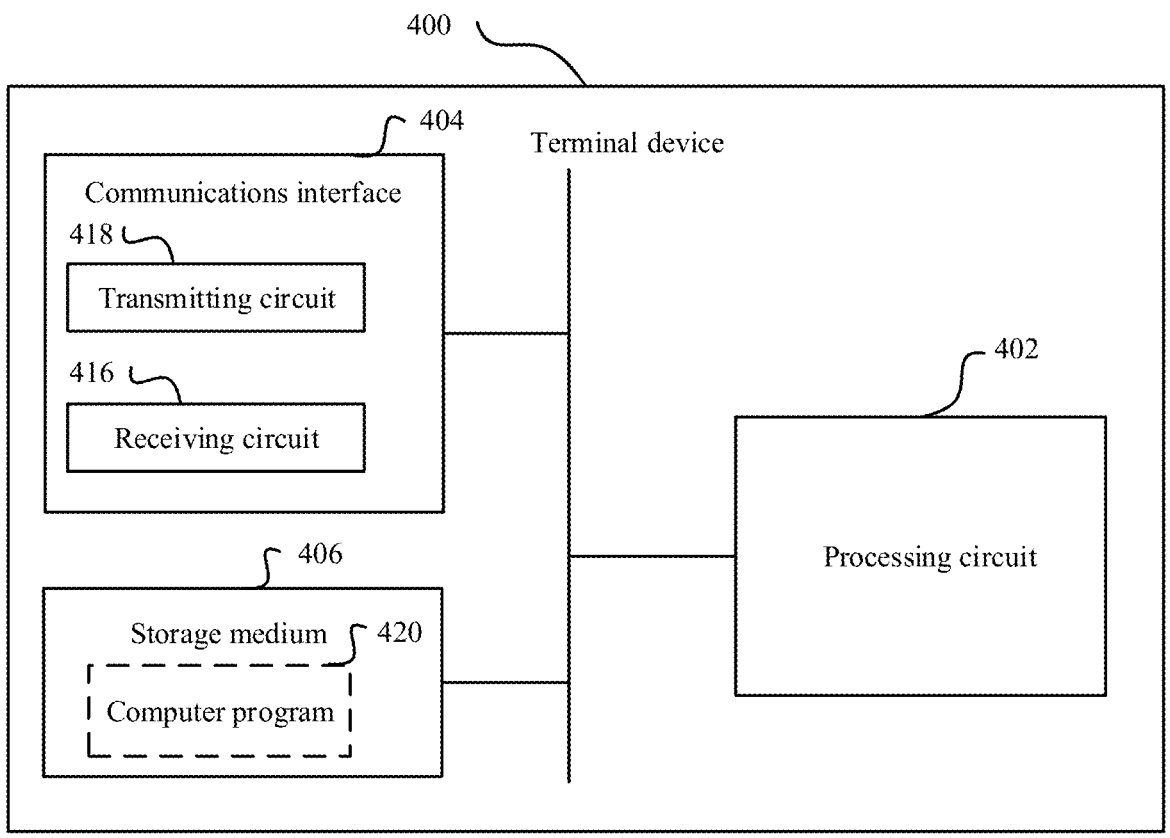
FIG. 17 is a schematic structural diagram of another terminal device according to an embodiment of this application.

An embodiment of this application further provides a terminal device 400. As shown in FIG. 17, the terminal device 400 includes a processing circuit 402, and a communications interface 404 and a storage medium 406 that are connected to the processing circuit 402.

The processing circuit 402 is configured to process data, control data access and storage, deliver a command, and control another component to perform an operation. The processing circuit 402 may be implemented as one or more processors, one or more controllers, and/or another structure that may be configured to execute a program. The processing circuit 402 may specifically include at least one of a general-purpose processor, a digital signal processor (DSP), an application-specific integrated circuit (ASIC), a field programmable gate array (FPGA), or another programmable logic component. The general-purpose processor may include a microprocessor, and any conventional processor, controller, microcontroller, or state machine. The processing circuit 402 may alternatively be implemented as a computing element such as a combination of the DSP and the microprocessor.

The storage medium 406 may include a non-transitory computer-readable storage medium, for example, a magnetic storage device (for example, a hard disk, a floppy disk, or a magnetic strip), an optical storage medium (for example, a digital versatile disc (DVD)), a smart card, a flash storage device, a random access memory (RAM), a read-only memory (ROM), a programmable ROM (PROM), an erasable PROM (EPROM), a register, and any combination thereof. The storage medium 406 may be coupled to the processing circuit 402, so that the processing circuit 402 may read information and write the information to the storage medium 406. Specifically, the storage medium 406 may be integrated into the processing circuit 402, or the storage medium 406 and the processing circuit 402 may be separated.

The communications interface 404 may include a circuit and/or a program to implement bidirectional communication between the terminal device 400 and one or more network devices (for example, routers, switches, access points, or the like). The communications interface 404 includes at least one receiving circuit 416 and/or at least one transmitting circuit 418. In an embodiment, the communications interface 404 may be entirely or partly implemented by a wireless modem.

In an embodiment, the storage medium 406 stores a computer program 420, and the processing circuit 402 is adapted to execute the computer program 420 stored in the storage medium 406, to implement some or all of the method steps in any one of the embodiments shown in FIG. 6 and FIG. 11 to FIG. 15B.

Figure 18:
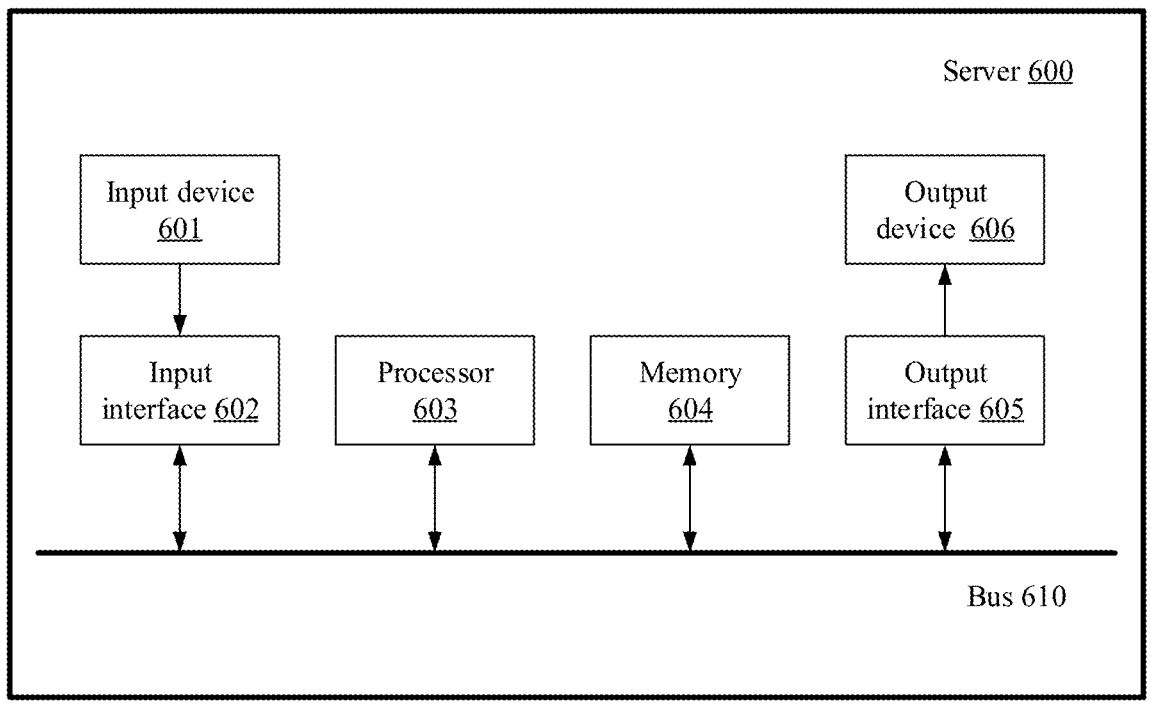
FIG. 18 is a schematic structural diagram of a server according to an embodiment of this application.

FIG. 18 is a structural diagram of an example of a hardware architecture of a server 600 for implementing a service open platform according to an embodiment of this application. As shown in FIG. 18, the server 600 may include an input device 601, an input interface 602, a processor 603, a memory 604, an output interface 605, and an output device 606. The input interface 602, the processor 603, the memory 604, and the output interface 605 are connected to each other by using a bus 610. The input device 601 and the output device 606 are separately connected to the bus 610 by using the input interface 602 and the output interface 605, to be connected to another component of the server 600. The memory 604 stores an executable program. The processor 603 includes one or more processing units, for example, a plurality of processor cores. When executing a computer executable instruction, the processor 603 may implement a function of the service open platform 200 described in the foregoing embodiments.

It should be noted that terms "executable program", "computer program", and "program" are used in the embodiments of this application. It should be widely interpreted as including but not limited to: instructions, instruction sets, code, code segments, subprograms, software modules, applications, software packages, threads, processes, functions, firmware, middleware, and the like. It may be clearly understood by a person skilled in the art that, for the purpose of convenient and brief description, for a detailed working process of the foregoing apparatus and unit, refer to a corresponding process in the foregoing method embodiments, and details are not described herein.

In the several embodiments provided in this application, it should be understood that the disclosed apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store an executable program, such as a USB flash drive, a removable hard disk, a read-only memory (ROM), a random access memory (RAM), a magnetic disk, or an optical disc.

What is claimed is:

1. A method for providing a service on a terminal device, comprising:
   identifying a user scenario of the terminal device, wherein the user scenario is related to a location of the terminal device or an area in which the terminal device is located;
   sending a scenario package request message to a service open platform responsive to determining that the user scenario meets an activation condition of a first scenario package, wherein the scenario package request message comprises an identification (ID) of the first scenario package, and wherein the first scenario package comprises at least one service related to the user scenario;
   receiving, by the terminal device, data of the first scenario package sent by the service open platform.

2. The method according to claim 1, further comprising:
   generating a service card based on the data;
   displaying the service card, wherein the service card comprises a user interface of the at least one service.

3. The method according to claim 2, further comprising:
   receiving an operation performed by a user on the user interface in the service card;
   providing a service corresponding to the user interface on which the user performs the operation.

4. The method according to claim 1, wherein the terminal device stores correspondence data that comprises a correspondence between an identifier of a first area and an identifier of a wireless access point that covers the first area, the terminal device is connected to the wireless access point, and the identifying the user scenario of the terminal device comprises: determining the user scenario of the terminal device based on the identifier of the wireless access point connected to the terminal device and the correspondence data.

5. The method according to claim 4, wherein the wireless access point comprises a base station, the identifier of the wireless access point comprises a cell ID of the base station, and the determining the user scenario of the terminal device based on the identifier of the wireless access point connected to the terminal device and the correspondence data comprises:

periodically obtaining, by a modem of the terminal device, a cell ID of the base station, and periodically transmitting the obtained cell ID to a microcontroller unit (MCU) of the terminal device, wherein the MCU is configured to process data simultaneously with an application processor (AP) of the terminal device being in a sleep mode;

receiving, by the MCU, the cell ID sent by the modem, and in response to determining, based on the correspondence data, that the received cell ID matches the cell ID of the base station that covers the first area, enabling a positioning module to determine a current location of the terminal device; and determining the user scenario of the terminal device based on the current location of the terminal device.

6. The method according to claim 4, wherein the wireless access point comprises a base station, the identifier of the wireless access point comprises a cell ID of the base station, and the determining the user scenario of the terminal device based on the identifier of the wireless access point connected to the terminal device and the correspondence data comprises:

periodically obtaining, by a modem of the terminal device, the cell ID of the base station connected to the terminal device, and periodically reporting the obtained cell ID to a microcontroller unit (MCU) of the terminal device, wherein the MCU is configured to process data simultaneously with an application processor (AP) of the terminal device being in a sleep mode; and receiving, by the MCU, the cell ID sent by the modem, and in response to determining, based on the correspondence data, that the received cell ID matches the cell ID of the base station that covers the first area, determining the user scenario of the terminal device, wherein the user scenario represents that the terminal device enters the first area.

7. The method according to claim 4, wherein the wireless access point comprises a base station and a Wi-Fi access point, the identifier of the wireless access point comprises a cell ID of the base station and a device identifier of the Wi-Fi access point, the correspondence data comprises a first correspondence between the identifier of the first area and the cell ID of the base station that covers the first area and a second correspondence between an identifier of a second area within the first area and a device identifier of a Wi-Fi access point that covers the second area; and the determining the user scenario of the terminal device based on the identifier of the wireless access point connected to the terminal device and the correspondence data comprises:

periodically obtaining, by a modem of the terminal device, a cell ID of the base station connected to the terminal device, and periodically transmitting the obtained cell ID to a microcontroller unit (MCU) of the terminal device, wherein the MCU is configured to process data simultaneously with an application processor (AP) of the terminal device being in a sleep mode;

receiving, by the MCU, the cell ID sent by the modem, and in response to determining, based on the correspondence data, that the received cell ID matches the cell ID of the base station that covers the first area, enabling a Wi-Fi module;

determining, by the Wi-Fi module based on a received Wi-Fi signal, a device identifier of a Wi-Fi access point that sends the Wi-Fi signal, and transmitting the obtained device identifier to the MCU; and receiving, by the MCU, the device identifier sent by the Wi-Fi module, and in response to determining, based on the correspondence data, that the received device identifier matches the device identifier of the Wi-Fi access point that covers the second area, determining the user scenario of the terminal device, wherein the user scenario represents that the terminal device enters the second area.

8. The method according to claim 5, wherein a period of reporting the cell ID by the modem is longer than a period of obtaining the cell ID.

9. The method according to claim 4, wherein the wireless access point is a Bluetooth device, the identifier of the wireless access point comprises an identifier of the Bluetooth device, and the determining the user scenario of the terminal device based on the identifier of the wireless access point connected to the terminal device and the correspondence data comprises:

determining, by a Bluetooth module of the terminal device based on a received Bluetooth signal, the identifier of the Bluetooth device that sends the Bluetooth signal, and transmitting the obtained identifier of the Bluetooth device to a microcontroller unit (MCU) of the terminal device, wherein the MCU is configured to process data simultaneously with an application processor (AP) of the terminal device being in a sleep mode;

receiving, by the MCU, the identifier of the Bluetooth device sent by the Bluetooth module, and in response to determining, based on the correspondence data, that the received identifier of the Bluetooth device sent by the Bluetooth module matches the identifier of the Bluetooth device that covers the first area, determining the user scenario of the terminal device, wherein the user scenario represents that the terminal device approaches or enters the first area.

10. The method according to claim 1, further comprising:
downloading, by the terminal device from the service open platform that maintains geographical location information of a wireless access point, correspondence data that comprises a correspondence between a geographical location information of the first area and an identifier of the wireless access point that covers the first area.

11. The method according to claim 1, wherein the at least one service comprise a public information guidance service in the user scenario.

12. The method according to claim 11, wherein the public information guidance service comprises scenario guidance and a scenario map.

13. A terminal device, comprising:
a microcontroller unit (MCU);
a communications interface; and
a processor, wherein:
the MCU is configured to identify a user scenario of the terminal device, wherein the user scenario is related to a location of the terminal device or an area in which the terminal device is located;
the processor is configured to: send a scenario package request message to a service open platform by using the communications interface responsive to determining that the user scenario meets an activation condition of a first scenario package, wherein the scenario package request message comprises an identification (ID) of the first scenario package, and wherein the first scenario package comprises at least one service related to the user scenario; and the communications interface is configured to receive data of the first scenario package and that is sent by the service open platform.

14. The terminal device according to claim 13, further comprising a display, wherein: the processor is further configured to: generate a service card based on the data received by the communications interface, wherein the service card comprises a user interface of the at least one service; and the display is configured to display the service card.

15. The terminal device according to claim 14, wherein the processor is further configured to: receive an operation performed by a user on the user interface in the service card; provide a service corresponding to the user interface on which the user performs the operation.

16. The terminal device according to claim 13, wherein the terminal device stores correspondence data that comprises a correspondence between a geographical location of a first area and an identifier of a wireless access point that covers the first area, and the MCU is configured to determine the user scenario of the terminal device based on the identifier of the wireless access point connected to the terminal device and the correspondence data.

17. The terminal device according to claim 16, wherein the wireless access point comprises a base station, the identifier of the wireless access point comprises a cell ID of the base station, and the terminal device further comprises: a modem, and a positioning module, wherein the MCU is configured to process data simultaneously with an application processor (AP) of the terminal device being in a sleep mode; wherein:

the modem is configured to: periodically obtain a cell ID of the base station connected to the terminal device, and periodically transmit the obtained cell ID to the MCU; and the MCU is configured to: in response to determining, based on the cell ID sent by the modem and the correspondence data, that the cell ID matches the cell ID of the base station that covers the first area, enable the positioning module to determine a current location of the terminal device.

18. The terminal device according to claim 16, wherein the wireless access point comprises a base station, the identifier of the wireless access point is a cell ID of the base station, and the terminal device further comprises a modem, wherein the MCU is configured to process data simultaneously with an application processor (AP) of the terminal device being in a sleep mode; wherein:

the modem is configured to: periodically obtain a cell ID of the base station connected to the terminal device, and periodically report the obtained cell ID to the MCU; and the MCU is configured to: receive the cell ID sent by the modem, and in response to determining, based on the correspondence data, that the received cell ID matches the cell ID of the base station that covers the first area, determine the user scenario of the terminal device, wherein the user scenario represents that the terminal device enters the first area.

19. The terminal device according to claim 16, wherein the wireless access point comprises a base station and a Wi-Fi access point, the identifier of the wireless access point is a cell ID of the base station and a device identifier of the Wi-Fi access point, correspondence data that comprises a first correspondence between an identifier of the first area and the cell ID of the base station that covers the first area and a second correspondence between an identifier of a second area within the first area and a device identifier of a Wi-Fi access point that covers the second area; and the terminal device further comprises a modem, and a Wi-Fi module, wherein the MCU is configured to process data simultaneously with an application processor (AP) of the terminal device being in a sleep mode; wherein:

the modem is configured to: periodically obtain a cell ID of the base station connected to the terminal device, and periodically transmit the obtained cell ID to the MCU;

the MCU is configured to: receive the cell ID sent by the modem, and in response to determining, based on the correspondence data, that the received cell ID matches the cell ID of the base station that covers the first area, enable the Wi-Fi module;

the Wi-Fi module is configured to: determine, based on a received Wi-Fi signal, a device identifier of a Wi-Fi access point that sends the Wi-Fi signal, and transmit the obtained device identifier to the MCU; and the MCU is further configured to: receive the device identifier sent by the Wi-Fi module, and in response to determining, based on the correspondence data, that the received device identifier matches the device identifier of the Wi-Fi access point that covers the second area, determine the user scenario of the terminal device, wherein the user scenario represents that the terminal device enters the second area.

20. The terminal device according to claim 16, wherein the wireless access point is a Bluetooth device, the identifier of the wireless access point comprises an identifier of the Bluetooth device, and the MCU is configured to:

determine, based on a received Bluetooth signal, the identifier of the Bluetooth device that sends the Bluetooth signal, and in response to determining, based on the correspondence data, that the identifier of the Bluetooth device that sends the Bluetooth signal matches the identifier of the Bluetooth device that covers the first area, determine the user scenario of the terminal device, wherein the user scenario represents that the terminal device enters the first area.

21. The terminal device according to claim 13, wherein the at least one service comprise a public information guidance service in the user scenario.

22. The terminal device according to claim 21, wherein the public information guidance service comprises scenario guidance and a scenario map.

23. A terminal device, comprising a processing circuit, a storage medium, and a computer program that is stored in the storage medium, wherein the processing circuit is configured to executed the computer program, so as to:

identify a user scenario of the terminal device, wherein the user scenario is related to a location of the terminal device or an area in which the terminal device is located;

send a scenario package request message to a service open platform responsive to determining that the user scenario meets an activation condition of a first scenario package, wherein the scenario package request message comprises an (identifier) ID of the first scenario package, and wherein the first scenario package comprises at least one service related to the user scenario;

receive data of the first scenario package sent by the service open platform;

generate a service card based on the data and display the service card, wherein the service card comprises a user interface of the at least one service;

receiving an operation performed by a user on the user interface in the service card; and provide a service corresponding to the user interface on which the user performs the operation.

24. The terminal device according to claim 23, wherein the processing circuit comprises an application processor and a microcontroller unit (MCU).

* * * * *